United States Patent
Buracchini et al.

(10) Patent No.: US 8,081,596 B1
(45) Date of Patent: Dec. 20, 2011

(54) METHOD AND A NETWORK ARCHITECTURE FOR CONFIGURING A RADIO TERMINAL, RADIO TERMINAL, NETWORK NODE AND A COMPUTER PROGRAM PRODUCT THEREFOR

(75) Inventors: Enrico Buracchini, Turin (IT); Paolo Goria, Turin (IT); Alessandro Trogolo, Turin (IT)

(73) Assignee: Telecom Italia S.p.A., Milan (IT)

( * ) Notice: Subject to any disclaimer, the term of this patent is extended or adjusted under 35 U.S.C. 154(b) by 519 days.

(21) Appl. No.: 11/666,439

(22) PCT Filed: Oct. 28, 2004

(86) PCT No.: PCT/EP2004/012168
§ 371 (c)(1),
(2), (4) Date: Apr. 27, 2007

(87) PCT Pub. No.: WO2006/045335
PCT Pub. Date: May 4, 2006

(51) Int. Cl.
*H04W 4/00* (2009.01)

(52) U.S. Cl. ........ 370/328; 455/418; 455/419; 455/420; 709/200; 709/223; 709/218

(58) Field of Classification Search .................. 709/200, 709/223, 218; 455/418–420, 561
See application file for complete search history.

(56) References Cited

U.S. PATENT DOCUMENTS

| | | | |
|---|---|---|---|
| 6,463,055 B1 | 10/2002 | Lupien et al. | |
| 6,577,614 B1 | 6/2003 | Cook et al. | |
| 6,751,227 B1 | 6/2004 | Ahmavaara et al. | |
| 6,799,203 B2 | 9/2004 | Oommen | |
| 7,035,932 B1 | 4/2006 | Dowling | |
| 2002/0012329 A1 | 1/2002 | Atkinson et al. | |
| 2002/0085568 A1 | 7/2002 | Oommen | |
| 2003/0035386 A1 | 2/2003 | Sullivan | |
| 2003/0084165 A1* | 5/2003 | Kjellberg et al. | 709/227 |
| 2003/0163551 A1 | 8/2003 | Riordan | |
| 2004/0049561 A1 | 3/2004 | Tafazolli et al. | |
| 2004/0072563 A1* | 4/2004 | Holcman et al. | 455/432.1 |
| 2004/0073901 A1* | 4/2004 | Imamatsu | 717/170 |
| 2004/0098715 A1 | 5/2004 | Aghera et al. | |
| 2004/0120281 A1* | 6/2004 | Gazzard | 370/328 |
| 2004/0147262 A1* | 7/2004 | Lescuyer et al. | 455/434 |
| 2004/0176129 A1 | 9/2004 | Menon et al. | |

(Continued)

FOREIGN PATENT DOCUMENTS

JP 2001-186074 7/2001

(Continued)

OTHER PUBLICATIONS

Yoshida, H. et al., "Radio System, Method for Downloading Software and Radio Terminal," Patent Abstract of Japan, JP No. 2001061186 A, published Mar. 6, 2001, 1 Sheet.

(Continued)

*Primary Examiner* — Kamran Afshar
*Assistant Examiner* — Edward Zhang
(74) *Attorney, Agent, or Firm* — Finnegan, Henderson, Farabow, Garrett & Dunner, L.L.P.

(57) ABSTRACT

Network architecture and a method for configuring a reconfigurable radio terminal, including a communication network and at least one radio terminal belonging to said communication network. The architecture further includes a node connected to the communication network and includes operating software modules suitable to reconfigure the radio terminal through an over-the-air connection and transparently to the communication network.

28 Claims, 18 Drawing Sheets

U.S. PATENT DOCUMENTS

| | | | |
|---|---|---|---|
| 2005/0007988 A1* | 1/2005 | Ferris et al. | 370/349 |
| 2005/0027789 A1* | 2/2005 | Luo et al. | 709/200 |
| 2005/0033829 A1 | 2/2005 | Oommen | |
| 2006/0020950 A1* | 1/2006 | Ladd et al. | 719/328 |
| 2006/0130053 A1* | 6/2006 | Buljore et al. | 717/173 |
| 2009/0067367 A1 | 3/2009 | Buracchini et al. | |

FOREIGN PATENT DOCUMENTS

| | | |
|---|---|---|
| JP | 2003-110606 | 4/2003 |
| JP | 2003-304235 | 10/2003 |
| WO | WO 98/30042 | 7/1998 |
| WO | WO-02058421 A1 * | 1/2002 |
| WO | WO 02/058421 A1 | 7/2002 |
| WO | WO 03/039175 A1 | 5/2003 |
| WO | WO 2006/045334 A1 | 5/2006 |
| WO | WO 2006/045335 A1 | 5/2006 |

OTHER PUBLICATIONS

Luo, J. et al., "Design of Software Download Management for Reconfigurable Terminals in WCDMA Systems," IEEE 2002 International Conference on Jun. 29-Jul. 1, 2002, vol. 1, pp. 182-186, (2002).

Mehta, M. et al., "Reconfigurable Terminals: An Overview of Architectural Solutions," IEEE Communications Magazine, vol. 39, No. 8, pp. 82-89, (Aug. 2001).

Mitola, J., "The Software Radio Architecture," IEEE Communications Magazine, pp. 26-38, (May 1995).

Buracchini, E., "The Software Radio Concept," IEEE Communications Magazine, pp. 138-143, (Sep. 2000).

Olaziregi, N. et al., "Architecture of IP Based Network Elements Supporting Reconfigurable Terminals," Scout Workshop, 7 pages, (Sep. 16, 2003).

3GPP, "3$^{rd}$ Generation Partnership Project; Technical Specification Group Services and System Aspects; Multimedia Broadcast/Multicast Service (MBMS); Architecture and Functional Description (Release 6)," 3GPP TS 23.246 v.6.4.0, pp. 1-42, (Sep. 2004).

SDR Forum, "Requirements for Radio Software Download for RF Reconfiguration," SDRF-02-A-0007-V0.0, pp. 1-2 and 8-11, (Nov. 13, 2002).

Arndt, M. et al., "Software Radio: The Challenges for Reconfigurable Terminals," Annals of Telecommunicatons, pp. 1-35, (Jul./Aug. 2002).

Micocci, S. et al., "Requirements on Network and Security Architecture and Traffic Management Schemes for Download Traffic Based on IP Principles in Cellular and Ad Hoc Networks," IST-2001-34091 Scout, D 4.1.1, pp. 1-136, (Oct. 31, 2002).

Office Action dated Dec. 2, 2009, in U.S. Appl. No. 11/666,508 (corresponding to US 2009/0067367 A1).

Office Action in Japan for counterpart application JP 538273-2007, dated Mar. 18, 2010.

* cited by examiner

METHOD AND A NETWORK ARCHITECTURE FOR CONFIGURING A RADIO TERMINAL, RADIO TERMINAL, NETWORK NODE AND A COMPUTER PROGRAM PRODUCT THEREFOR

CROSS REFERENCE TO RELATED APPLICATION

This application is a national phase application based on PCT/EP2004/012168, filed Oct. 28, 2004, the content of which is incorporated herein by reference.

FIELD OF INVENTION

The present invention relates in general to radio communication networks and to reconfigurable radio terminals using a radio communication network. More particularly, the present invention concerns the configuration of a re-configurable radio terminal, said configuration being carried out by installing in said radio terminal an operating software downloaded over the air (OTA) from the radio communication network.

BACKGROUND OF INVENTION

It is known from the literature (J. Mitola, "The Software Radio Architecture", IEEE Communications Magazine, May 1995 and E. Buracchini, "The Software Radio Concept", IEEE Communications Magazine, September 2000) that reconfigurable systems like terminals, base stations and network nodes, are equipments whose operating working may be reconfigured at will. For instance, a reconfigurable radio terminal able to work with a second generation system (2G), like GSM/GPRS (Global System for Mobile communication/General Packet Radio Service), can be reconfigured in order to become able to work with a third generation system (3G), like UMTS (Universal Mobile Telecommunication System) or CDMA 2000 (Code Division Multiple Access 2000), or WI-FI (WIreless FIdelity) or DVB-T (Digital Video Broadcasting Terrestrial) systems and so on.

It is meant by "system" a plurality of elements co-ordinated between them according to predetermined criteria, that is co-ordinated according to a "Standard", in order to perform a specific function which is, for instance, that of operating as a communication network.

In present document examples of systems are the GSM system, the GPRS system, the UMTS system, the WLAN (Wireless Local Area Network) system and so on, each of them complying with a corresponding Standard.

In order to carry out the reconfiguration of a terminal, it is necessary that the operative functions of the terminal are realised with a technology which is in turn reconfigurable. Concerning this, the reconfigurable terminals or devices are provided with a reprogrammable hardware constituted, for example, by a plurality of FPGAs (Field Programmable Gate Array), DSPs (Digital Signal Processor) and microprocessors: the single functionalities of the device, even at the lowest level, are performed by a software code. As a consequence, for reconfiguring a reprogrammable device, it suffices to replace the operating software managing the hardware of the device itself.

By the term "operating software" it is meant in present description the software, organised in libraries, which defines both the radio interface or lower layers (e.g. L1, L2, L3) and the upper layers (e.g. L4 up to L7) of the protocol stack of a considered system, like for instance GSM/GPRS, UMTS and so on.

As known, in the telecommunication domain, the most employed method for obtaining a functional grouping is the OSI model (Open System Interconnection). The functionalities are grouped in functional planes or layers represented under the form of a stack of layers.

Each layer provides services to the immediately higher layer, said services being in turn improvements of the services provided by the immediately lower layer.

The lowest layer (layer 1) is generally intended for physically transmitting the information.

According to the OSI specification, the standard number of layers is 7: respectively physical, connection, network, transport, session, presentation and application layer. Each system, e.g. GSM/GPRS, UMTS and so on, implements the necessary part of said standard stack.

When considering a radio terminal, the benefits provided when using a reconfigurable hardware are many, but one benefit is evidently immediate: the radio terminal can be reconfigured according to the system covering the area where the terminal is located (working area). Therefore, if the terminal is used in an area covered by a second generation system, like GSM/GPRS, the terminal can be configured in order to be able to receive said system; likewise, in an area covered by a third generation system, like UMTS, the terminal can be configured accordingly.

It is known that a software code may be transferred or downloaded to a terminal at least in three different ways:
  via a smart card by using a SIM (Subscriber Identity Module) to be inserted inside the radio mobile terminal;
  via an external connection by using for instance a link with a personal computer through an infrared/serial/USB port;
  via radio or over-the-air (OTA) by using a specific radio channel.

Concerning software downloading, the fundamental steps of a generic protocol allowing to manage the downloading of a software to a terminal have been defined in the framework of the Software Defined Radio Forum (SDR Forum) as reachable via the URL: www.sdrforum.org.

The protocol, as defined by SDR Forum, is of the client-server type.

The downloading protocol steps are the following ones:
  download initiation: step during which the terminal communicates to the server, on which a software to be downloaded is resident, the intention to begin a software download;
  mutual authentication: the terminal and the server authenticate each other;
  capability exchange: the server communicates the capability information relative to the software to be downloaded and the terminal verifies whether the software can be loaded into the terminal memory, installed therein and run;
  download acceptance: the server communicates to the terminal the downloading, installation and billing options; the terminal decides whether the indications provided by the server are acceptable or not;
  download and integrity test: during the software download, the received code is tested; the terminal requests the retransmission of the incorrectly received radio blocks;
  installation: during the installation step, the software billing and licensing conditions are provided by the server;

in-situ testing: before starting the software, the terminal carries out some tests with the help of test vectors downloaded together with the software code;

non repudiation exchange: once the software code has been installed and tested, the terminal confirms to the server that the installation was successful in order to start, for example, the billing procedure.

It is known from prior art, e.g. E. Buracchini, "The Software Radio Concept", IEEE Communications Magazine, September 2000, that the software downloading via radio or OTA foresees the use by the terminal of a radio channel. Moreover it is known that the download of software code can be done in two different ways, depending on the typology of the radio channel:

"out of band" way: by means of a "universal" channel independent from the current system, e.g. when the terminal is switched on, it automatically tunes to said channel and performs the download of the operating software relative to the system operating in the working area;

"in band" way: by using the radio channels of the standard cellular systems of second and third generation, like GSM/GPRS and UMTS respectively, this way provides that the terminal, already operating on one of these channels, receives the operating software relative to a system different from that currently used; for instance, a reconfigurable terminal operating with a second generation system, like GSM/GPRS, can perform the download of a third generation system, like UMTS, by using the second generation radio channel according to which it is working.

An example of "out of band" software download is for instance described in the Japanese Patent Application No. 2001061186. This document describes a system and a method for downloading software content over-the-air. When a radio terminal is switched on, it seeks on an universal channel what the current system in the working area is and carries out the software download relative to the indicated system.

An example of "in band" software download is for instance described in the US Patent Application No. 2003/0163551. This document describes a system and a method for downloading software over-the-air by using:

dedicated channels during the negotiation steps between server and terminal (capability exchange, authentication, billing and so on), and shared common channels during the download procedure in order to provide the download service to as many users as possible simultaneously, without imposing a handicap on the available radio resources.

When considering the "in band" download way, the document AAVV, "Architecture of IP based Network Elements Supporting Reconfigurable Terminals", SCOUT Workshop 16 Sep. 2003 suggests to modify deeply some protocols and some network nodes, e.g. the radio access nodes and/or Core Networks nodes, in order to make it possible to manage the download of an operating software.

Such modifications imply a considerable effort for the equipment manufacturers and for the network operators and dramatically impact on the Standards of the existing cellular systems. Therefore the known techniques exhibit the limit that, when it is desired to add to an already existing cellular network, like for instance GSM/GPRS or UMTS, the operating software download management for reconfigurable terminals, heavy modifications to the protocols and to the network nodes are necessary.

Considering the out of band way, according to prior art, it is needed to implement a dedicated radio channel and therefore dedicated network equipments or network nodes in the network for its implementation.

In summary, Applicant notes that known prior art both in case of in band and out of band software download provides for deeply modifying some protocols and some network nodes in order to configure a re-configurable radio terminal.

SUMMARY OF INVENTION

It is therefore an object of the present invention to manage the download of an operating software for reconfiguring a radio terminal without modifying the architecture and the protocols of the network nodes.

The above object of the present invention is achieved through a method, a network architecture and a computer program product as claimed in the hereby attached claims.

According to the invention there are provided an architecture, a method and a related computer program product or set of computer program products, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed modular fashion. Specifically, according to present invention there are provided, in a preferred embodiment, an architecture and a method according to which the terminal can perform via radio the download of an operating software by which it is possible to reconfigure the mobile radio terminal, the architecture and the method not being intrusive; in particular, the download may be implemented in a way transparent to the used cellular radio access system which may belong to the second generation, like GSM/GPRS, IS95 (Interim Standard 95) or PDC (Phone Digital Cellular), or to the third generation (for instance radio access systems of the family IMT 2000—International Mobile Telecommunications 2000).

According to the invention, the architecture is provided with a node connected to the network able to manage the download of an operating software over the air, without impacting on the already existing network protocols.

According to a preferred embodiment of the invention, the computer program product exploits the TCP/IP (Transport Control Protocol/Internet Protocol) protocol which is supported both by the second and by the third generation systems.

According to the invention, the proposed protocol is coherent with the recommendations provided by the SDR Forum.

According to the invention, the Over The Air software download is transparent to the access network and of the Core Network.

According to the invention, the architecture is independent from the considered system and can be implemented in any present or future system, such a second generation systems, like for instance GSM/GPRS, third generation systems, like UMTS, and others, like for instance DVB, WLAN, 802.16, etc.

According to the invention, it is provided a-node of server type on which the operating software is resident and which is connected to the network and able to perform the download of the operating software on the radio terminal. Moreover, according to the invention, the method employed for reconfiguring the radio terminal is not intrusive and can exploit all features of the network by which it is supported.

BRIEF DESCRIPTION OF THE DRAWINGS

The invention will be now disclosed herein below with reference to the attached Figures of preferred but non limiting embodiments thereof, in which.

Throughout all the Figures the same references have been used to indicate components that are equal or implement substantially equivalent functions.

DETAILED DESCRIPTION OF THE INVENTION

Figure 1:
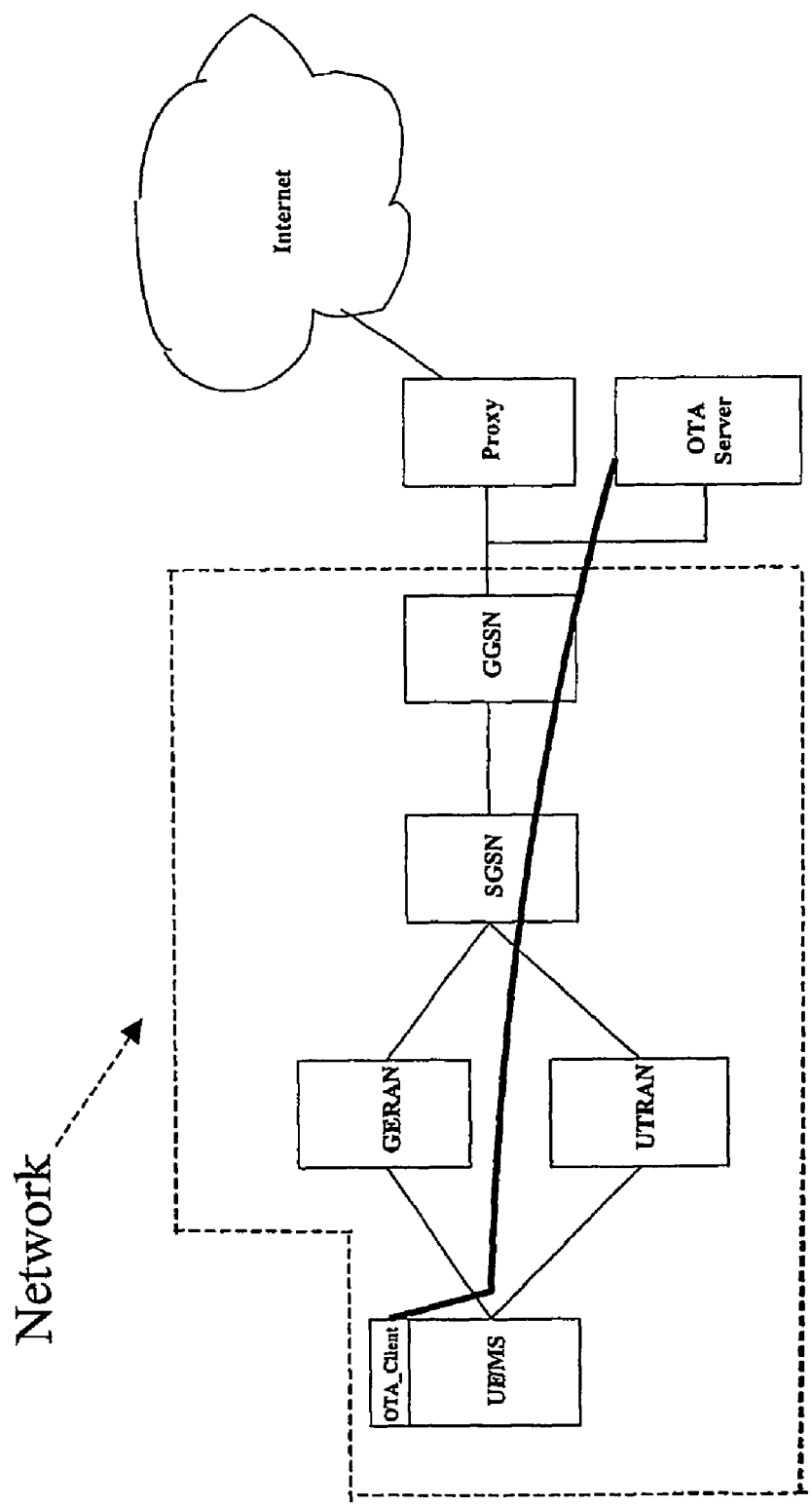
FIG. 1 illustrates an embodiment of the invention implemented in a generic GPRS or UMTS network.

With reference to FIG. 1, it is represented an embodiment of the invention implemented in a second (2G) and third (3G) generation system. In particular, it is represented a Network architecture or architecture comprising a generic GPRS, a generic UMTS network (Network) and a server (OTA server) or node connected to the Network.

The Network further comprises a reconfigurable terminal UE/MS (User Equipment/Mobile Station), a radio access networks GERAN (GSM EDGE Radio Access Network) of a GPRS system and a UTRAN (UMTS Terrestrial Radio Access Network) of a UMTS system and the packet domain Core Network, constituted, for example, by the nodes SGSN (Serving GPRS Support Node) and GGSN (Gateway GPRS Support Node). The node GGSN is connected, for example, through a server PROXY (PROXY), to a network of Internet type (Internet).

The terminal UE/MS is provided, according to a preferred embodiment of present invention, with a software application, called OTA-Client, which is able to manage the download of an operating software from the OTA-Server directly connected, for example, to the node GGSN of the Core Network. The OTA-Server, as could be appreciated by a skilled person, may also be connected indirectly to the core network, through, for example, one or more communication devices of known type.

The software application OTA-Client and the corresponding node OTA-Server exploit, for example, the transport protocol TCP/IP.

The architecture of the OTA-Server provides for a context for each OTA-Client with which a download session is active. The working of the software application provides for a state diagram for each OTA-Client and for the corresponding context defined as Client-Context managed by the OTA-Server.

According to a preferred embodiment, the operative software comprises a set of operative software modules, preferably a plurality of software modules The invention provides for the downloading of operating software modules implementing at least one set of elements of a protocol stack employed in the network in order to reconfigure a radio terminal UE/MS.

As a skilled person may appreciate, it is also possible to download one operating software module in order to update one or more protocol layers or a part of a specific layer of the protocol stack with the purpose of inserting new functionalities, updates or fixing bugs.

Figure 2:
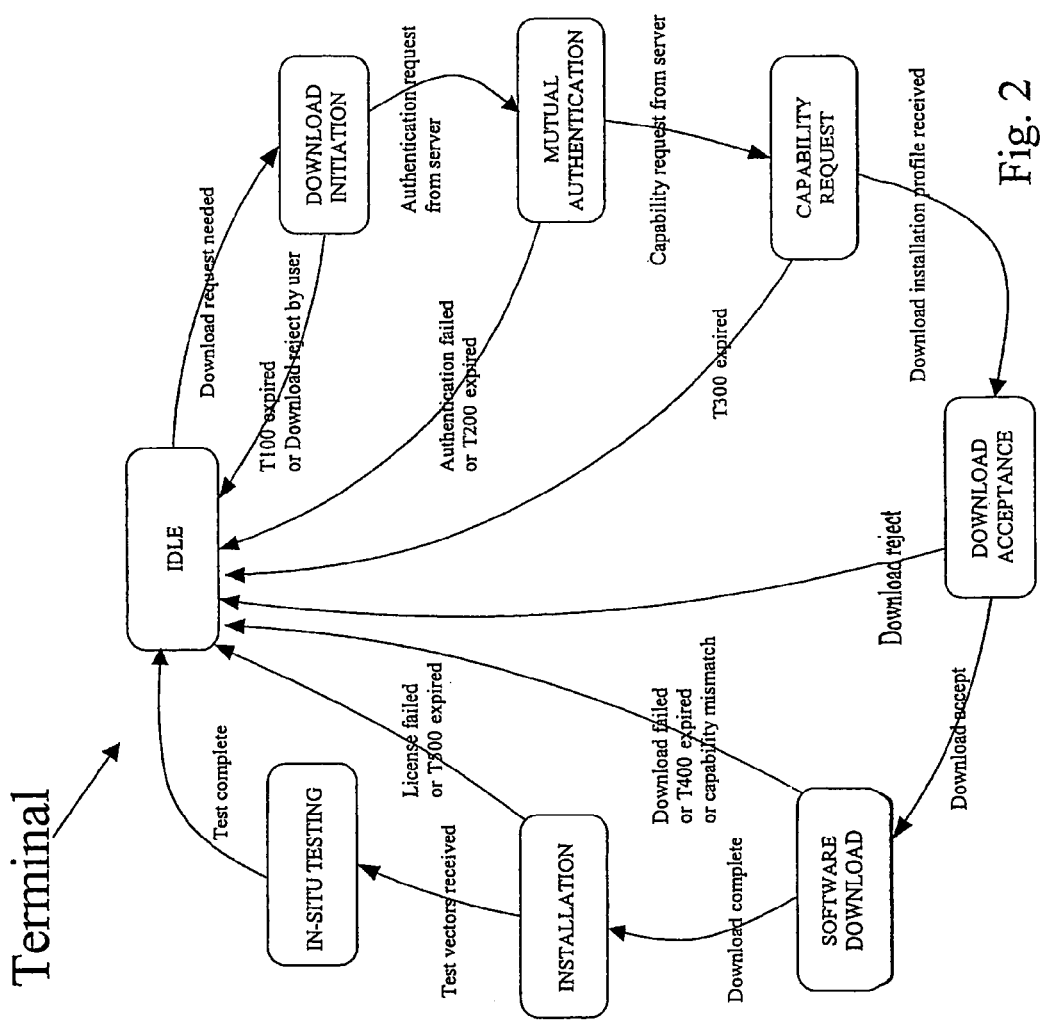
FIG. 2 is a state diagram of the protocol steps carried out by a computer program product on the radio terminal side.

With reference to FIG. 2, it is represented the state diagram of the software application OTA-Client installed in the terminal UE/MS (Terminal side).

The terms used for naming the states are purely indicative, as it is significant the corresponding behaviour as described.

According to a preferred embodiment of present invention, the states and the relative transitions of the OTA-Client, are the followings:

state IDLE: the OTA-Client or Client is in this state when no software download procedure is active; the Client returns to this state if the procedure is correctly terminated or if a failure occurs;

state DOWNLOAD INITIATION: when it is necessary to perform the download of the operating software, for instance when it is requested by the user or it is controlled by the network, the Client enters this state and starts a timer T100; the timer T100 is stopped in case of a state change; if the timer T100 expires before a state change, the client returns to the state IDLE;

state MUTUAL AUTHENTICATION: in this state the Client performs the mutual authentication with the OTA-Server; the Client enters this state when an authentication request comes from the Server; the Client starts a timer T200; the timer T200 is stopped in case of a state change; if the timer T200 expires before a state change or the authentication fails, the Client returns to the state IDLE;

state CAPABILITY REQUEST: in this state the Client provides to the Server its capability; the Client enters this state when the Server requests its capability; the client starts a timer T300; the timer T300 is stopped in case of a state change; if the timer T300 expires before a state change, the client returns to the state IDLE;

state DOWNLOAD ACCEPTANCE: in this state the Client determines whether to continue the download according to the information received by the Server; the client enters this state when it receives from the Server the download profile to be carried out; if the received profile is rejected, the client returns to the state IDLE;

state SOFTWARE DOWNLOAD: in this state the Client performs the software download; the Client enters this state if the download profile is accepted; the Client starts a timer T400; the timer T400 is reset and restarted at each software block received by the Server; the timer T400 is stopped in case of a state change; if the timer T400 expires before a state change or the download fails or the downloaded software does not comply with the capability, the client returns to the state IDLE;

state INSTALLATION: in this state the client sends a request to the server for a license and installs the operating software; the Client enters this state at the end of the download; the Client starts a timer T500; the timer T500 is stopped in case of a state change; if the timer 1500 expires before a state change or the license is not accepted, the Client returns to the state IDLE;

state IN-SITU TESTING: in this state the Client performs some tests on the downloaded software by using some test vectors received by the Server; the Client enters this state when the operating software has been installed; once the tests have ended, the Client returns to the state IDLE.

Figure 3:
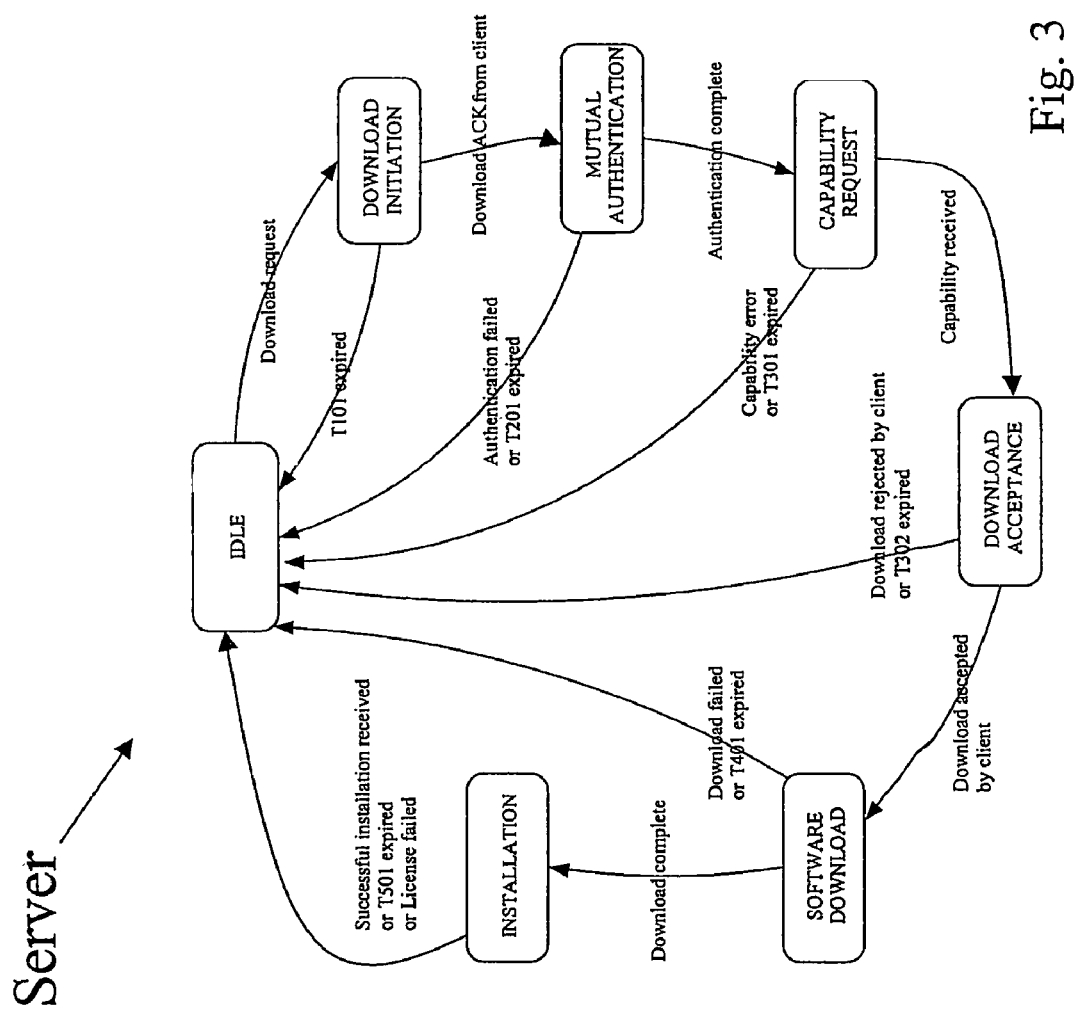
FIG. 3 is a state diagram of the protocol steps carried out by a server on the network side.

With reference to FIG. 3, it is represented the state diagram of a Client-Context managed by the OTA Server (Server-side).

As previously remarked, the terms used for naming the states are purely indicative, as it is significant the corresponding behaviour as described.

The states and the relative transitions of the Client-Context are now described:

state IDLE: the Client-Context managed by the OTA-Server is in this state when no software download procedure is active; the Client-Context returns to this state if a procedure is correctly terminated or if a failure occurs;

state DOWNLOAD INITIATION: in this state the Client-Context or OTA-Server instructs the OTA-Client to perform a download; when it is necessary to perform the download of the operating software, said download being for instance requested by the OTA-Client or according to a scheduled periodic update, the Client-Context enters this state and starts a timer T101; the timer T101 is stopped before a state change; if the timer T101 expires before a state change, then the Client-Context returns to the state IDLE;

state MUTUAL AUTHENTICATION: in this state the Server authenticates itself and requests the OTA-Client to identify itself; the OTA-Server enters this state when it receives from the Client the download confirmation; the OTA-Server starts a timer T201; the timer T201 is stopped in case of a state change; if the timer T201 expires before a state change or the authentication fails, the Client-Context returns to the state IDLE;

state CAPABILITY REQUEST: in this state the OTA-Server requests to the OTA-Client its capability; the OTA-Server enters this state when the authentication is completed; the OTA-Server starts a timer T301; the timer T301 is stopped in case of a state change; if the timer T301 expires before a state change or the capability does not allow the download, the Client-Context returns to the state IDLE;

state DOWNLOAD ACCEPTANCE: in this state the OTA-Server communicates to the OTA-Client the download profile; the OTA-Server enters this state when it receives the terminal capability and said capability is accepted; the OTA-Server starts a timer T302; the timer T302 is stopped in case of a state change; if the timer T302 expires before a state change or the OTA-Client rejects the proposed download, the Client-Context returns to the state IDLE;

state SOFTWARE DOWNLOAD: in this state the OTA-Server performs the download of the software towards the OTA-Client; the OTA-Server enters this state if the download profile is accepted by the OTA-Client; the Client starts a timer T401; the timer T401 is reset and restarted at each acknowledgement signal Ack received by the client; the tinier T401 is stopped in case of a state change; if the timer T401 expires before a state change or the download fails, the Client-Context returns to the state IDLE;

state INSTALLATION: in this state the OTA-Server communicates to the OTA-Client the terms of the license and waits until the client performs the installation and the tests of the downloaded software; the OTA-Server enters this state when the download has ended; the OTA-Server starts a timer T501; the timer T501 is stopped in case of a state change; if the timer T501 expires before a state change or the license has not been accepted by the OTA-Client, the OTA-Client returns to the state IDLE; if the OTA-Server receives an acknowledgement signal concerning the successful installation by the OTA-Client, it returns to the state IDLE.

The structure of the protocol messages exchanged between the OTA-Server and the OTA-Client will be now described in detail with reference to the FIGS. 4*a*-4*k*.

The terms used for naming the messages and, related fields are purely indicative, as it is significant the corresponding definition as described.

Figure 4A:
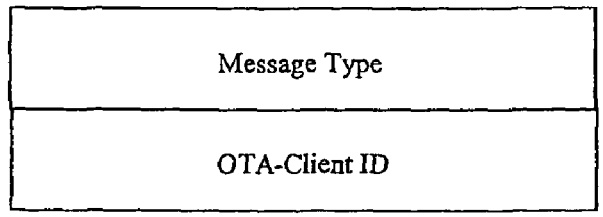
FIG. 4a to FIG. 4k illustrate the structure of the protocol messages exchanged between a mobile radio terminal and the server.

With reference to FIG. 4*a*, it is described the structure of the message Request Download Initiation. This message is sent from the OTA-Client to the OTA-Server. By this message the terminal requests the Server to begin a download session. Generally, each download session is controlled by the OTA-Server.

The fields provided in this case are at least a set of the following ones:

Message_Type: identifies the sent message type (Request Download Initiation);

OTA-Client_ID: identifies the OTA-Client performing the request.

Figure 4B:
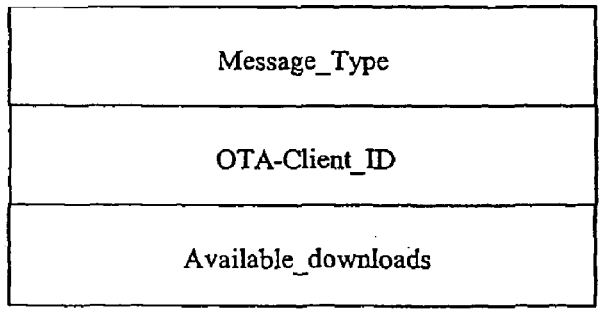

With reference to FIG. 4*b*, it is described the structure of the message Download Request. This message is sent from the OTA-Server to the OTA-Client. By this message the Server commands the Client to begin a download session. The fields provided in this case are at least a set of the following ones:

Message_Type: identifies the sent message type (Download Request);

OTA-Client_ID: identifies the OTA-Client towards which the request is made;

Available_Download(s): comprises the list of the possible downloads; each element contains a description string and a numerical identifier; the number of elements present in the list is variable.

Figure 4C:
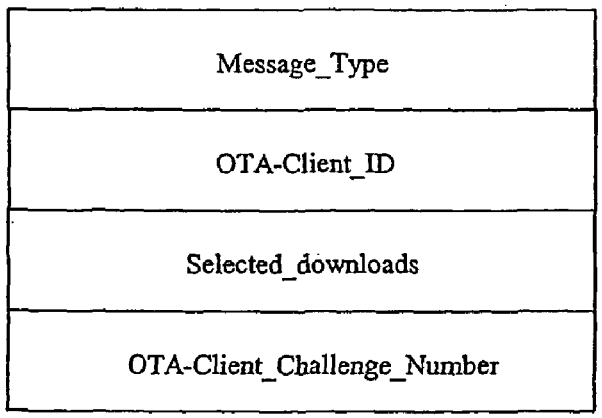

With reference to the FIG. 4*c*, it is described the structure of the message Download Ack. This message is sent from the OTA-Client to the OTA-Server. By this message the OTA-Client communicates to the OTA-Server the consent to begin a download session.

The fields provided in this case are at least a set of the following ones:

Message_Type: identifies the sent message type (Download Ack);

OTA-Client_ID: identifies the OTA-Client sending the message;

Selected_Download(s): comprises the list of the downloads selected by the user; each element contains a description string and a numerical identifier; the number of elements present in the list is variable;

OTA-Client_Challenge_Number: is a random number that the OTA-Server will encrypt with its own key and a suitable ciphering algorithm, for instance AES (Advanced Encryption Standard) algorithm (AES), in order to perform the first step of the mutual authentication.

Again with reference to FIG. 4*a*, it is described the structure of the message Download Reject. This message is sent from the OTA-Client to the OTA-Server. By this message the OTA-Client communicates to the OTA-Server that it can not begin a download session.

The fields provided in this case are at least a set of the following ones:

Message_Type: identifies the sent message type (Download Reject);

OTA-Client_ID: identifies the OTA-Client sending the message.

Figure 4D:
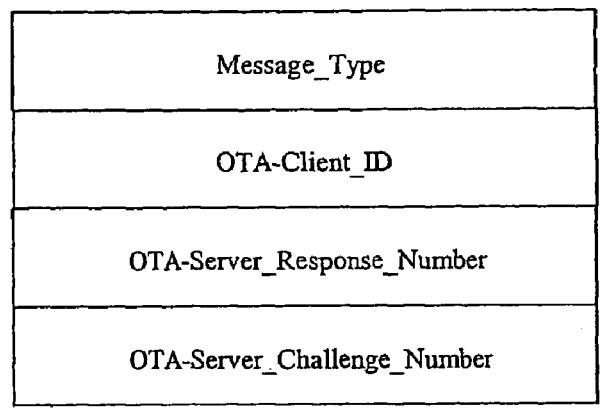

With reference to FIG. 4d, it is described the structure of the Authentication Request message. This message is sent from the OTA-Server to the OTA-Client. By this message the OTA-Server communicates its credentials to the OTA-Client and requires that the OTA-Client identifies itself.

The fields provided in this case are at least a set of the following ones:
  Message_Type: identifies the sent message type (Authentication Request);
  OTA-Client_ID: identifies the OTA-Client to which the message is sent;
  OTA-Server_Response_Number is a number encrypted by the OTA-Server with its own key and a suitable ciphering algorithm, like for instance AES, concluding the first step of the mutual authentication;
  OTA-Server_Challenge_Number: is a random number that the client will encrypt with its own key and a suitable ciphering algorithm, like for instance. AES, in order to perform the second step of the mutual authentication.

Figure 4E:
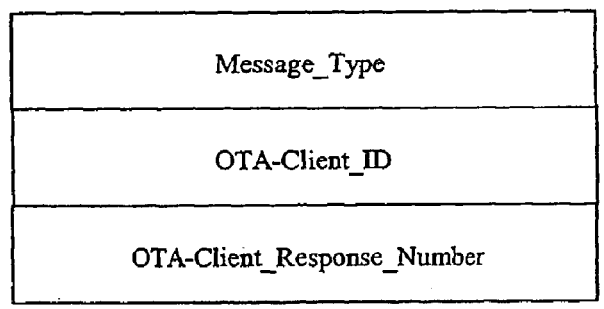

With reference to FIG. 4e, it is described the structure of the message Authentication Response. This message is sent from the OTA-Client to the OTA-Server. By this message the client communicates its credentials to the OTA-Server, having already authenticated the Server.

The fields provided in this case are at least a set of the following ones:
  Message_Type: identifies the sent message type (Authentication Response);
  OTA-Client_ID: identifies the OTA-Client sending the message;
  OTA-Client_Response_Number identifies a number encrypted by the OTA-Client with its own key and a suitable ciphering algorithm, like for instance AES, concluding the second and last step of the mutual authentication.

Again with reference to FIG. 4a, it is described the structure of the message Authentication Failed. This message is sent from the OTA-Server to the OTA-Client. By this message the OTA-Server/OTA-Client communicates to the OTA-Client/OTA-Server that the OTA-Server has not authenticated the OTA-Client or vice versa.

The fields provided in this case are at least a set of the following ones:
  Message_Type: identifies the sent message type (Authentication Failed);
  OTA-Client_ID: identifies the OTA-Client sending/receiving the message.

Again with reference to FIG. 4a, it is described the structure of the message Capability Request. This message is sent from the OTA-Server to the OTA-Client. By this message the OTA-Client requests to the OTA-Server its reconfigurability options.

Figure 4F:
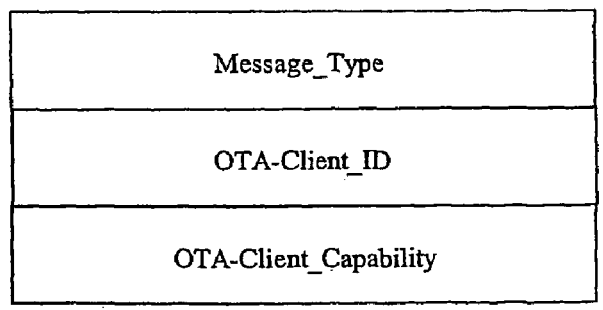

The fields provided in this case are at least a set of the following ones:
  Message_Type: identifies the sent message type (Capability Request);
  OTA-Client_ID: identifies the OTA-Client to which the message is sent. With reference to FIG. 4f, it is described the structure of the message Capability Response. This message is sent from the OTA-Client to the OTA-Server. By this message the OTA-Client informs the OTA-Server about its reconfigurability options.

The fields provided in this case are at least a set of the following ones:
  Message_Type: identifies the sent message type (Capability Response);
  OTA-Client ID: identifies the OTA-Client sending the message;
  OTA-Client_Capability: describes the terminal reconfigurability options.

Figure 4G:
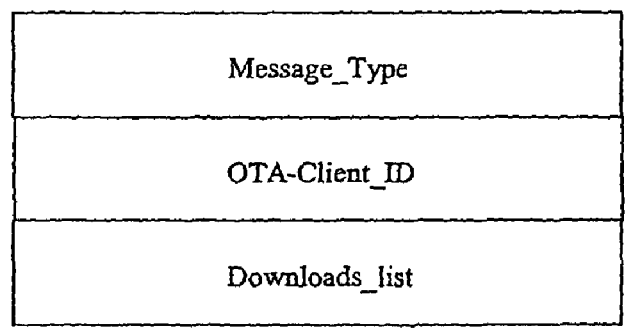

With reference to FIG. 4g, it is described the structure of the message Download Description. This message is sent from the OTA-Server to the OTA-Client. By this message the OTA-Server reports to the OTA-Client the data relative to the download.

The fields provided in this case are at least a set of the following ones:
  Message_Type: identifies the sent message type (Download Description);
  OTA-Client_ID: identifies the OTA-Client to which the message is sent;
  Downloads_list: comprises one element for each download selected by the client, which in turn includes the following fields:
  Download_Block_Number: is the number of radio blocks into which the operating software will be segmented before being transmitted to the client;
  Billing_criteria: are the criteria concerning the possible download billing;
  Installation_criteria: are the criteria concerning the software installation.

Again with reference to FIG. 4a, it is described the structure of the message Download Accept. This message is sent from the OTA-Client to the OTA-Server. By this message the OTA-Client confirms the selected download(s).

The fields provided in this case are at least a set of the following ones:
  Message_Type: identifies the sent message type (Download Accept);
  OTA-Client_ID: identifies the OTA-Client sending the message.

Again with reference to FIG. 4a, it is described the structure of the message Download Reject. This message is sent from the OTA-Client to the OTA-Server. By this message the OTA-Client renounces to the selected download(s).

The fields provided in this case are at least a set of the following ones:
  Message_Type: identifies the sent message type (Download Reject);
  OTA-Client_ID: identifies the OTA-Client sending the message.

Again with reference to FIG. 4a, it is described the structure of the message Download Failed. This message is sent from the OTA-Client to the OTA-Server. By this message the OTA-Client informs the OTA-Server that there is a fault in the software download procedure.

The fields provided in this case are at least a set of the following ones:
  Message_Type: identifies the sent message type (Download Failed);
  OTA-Client_ID: identifies the OTA-Client sending the message.

Again with reference to FIG. 4a, it is described the structure of the message License Request. This message is sent from the OTA-Client to the OTA-Server. By this message the client requests to the server the key for decrypting the downloaded operating software and for installing it.

Figure 4H:
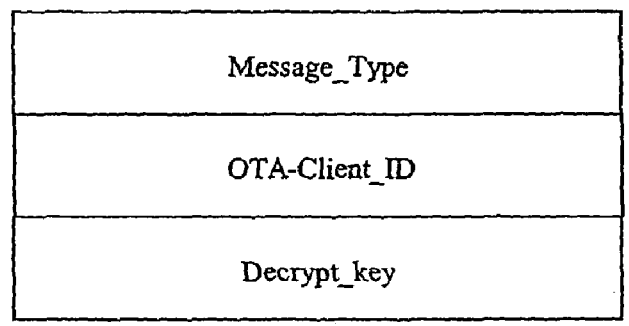

The fields provided in this case are at least a set of the following ones:
- Message_Type: identifies the sent message type (License Request);
- OTA-Client_ID: identifies the OTA-Client sending the message. With reference to FIG. 4h, it is described the structure of the message License Response. This message is sent from the OTA-Server to the OTA-Client. By this message the OTA-Server communicates to the OTA-Client the key for decrypting the downloaded operating software and for installing it.

The fields provided in this case are at least a set of the following ones:
- Message_Type: identifies the sent message type (License Response);
- OTA-Client_ID: identifies the OTA-Client to which the message is sent;
- Decrypt_key: is the key used for decrypting the operating software.

Again with reference to FIG. 4a, it is described the structure of the message License Accept. This message is sent from the OTA-Client to the OTA-Server. By this message the OTA-Client indicates to the OTA-Server that the downloaded operating software has been correctly decrypted.

The fields provided in this case are at least a set of the following ones:
- Message_Type: identifies the sent message type (License Accept);
- OTA-Client_ID: identifies the OTA-Client sending the message.

Again with reference to FIG. 4a, it is described the structure of the message License Failed. This message is sent from the OTA-Client to the OTA-Server. By this message the OTA-Client informs the OTA-Server that the downloaded operating software has not been correctly decrypted.

The fields provided in this case are at least a set of the following ones:
- Message_Type: identifies the sent message type (License Failed);
- OTA-Client_ID: identifies the OTA-Client sending the message.

Figure 4I:
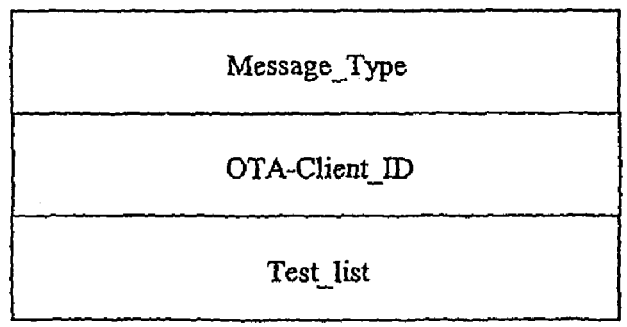

With reference to FIG. 4i, it is described the structure of the message Test Description. This message is sent from the OTA-Server to the OTA-Client. By this message the OTA-Server indicates to the OTA-Client the tests to be performed on the downloaded operating software before starting it.

The fields provided in this case are at least a set of the following ones:
- Message_Type: identifies the sent message type (Test Description);
- OTA-Client_ID: identifies the OTA-Client to which the message is sent;
- Test_list: comprises one element for each test to be performed and includes in turn the field:
  - Test_vector comprises the test description.

Again with reference to FIG. 4a, it is described the structure of the message Installation Successful. This message is sent from the OTA-Client to the OTA-Server. By this message the OTA-Client indicates to the OTA-Server that the testing of the downloaded operating software has been successful.

The fields provided in this case are at least a set of the following ones:
- Message_Type: identifies the sent message type (Installation Successful);
- OTA-Client_ID: identifies the OTA-Client sending the message.

Again with reference to FIG. 4a, it is described the structure of the message Installation Failed. This message is sent from the OTA-Client to the OTA-Server. By this message the OTA-Client informs the OTA-Server that the testing of the downloaded operating software has not been successful.

The fields provided in this case are at least a set of the following ones:
- Message_Type: identifies the sent message type (Installation Failed);
- OTA-Client_ID: identifies the OTA-Client sending the message:

The window protocol used for transmitting the operating software from the server to the client is based, on two Protocols Data Units, or PDUs, called Block and Ack.

Figure 4J:
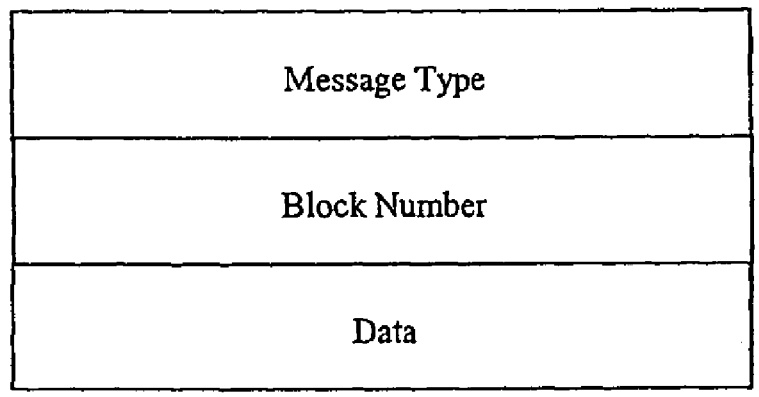

With reference to FIG. 4j, it is described the structure of a radio block Block into which the operating software has been segmented.

The fields provided in this case are at least a set of the following ones:
- Message_Type: identifies the block type;
- Block_Number: identifies the sequential number of the radio block, said sequential number being used when the OTA-Client reassembles the whole operating software;
- Data: are contained in the radio block, said data having typically a size of 1-2 kBytes.

Figure 4K:
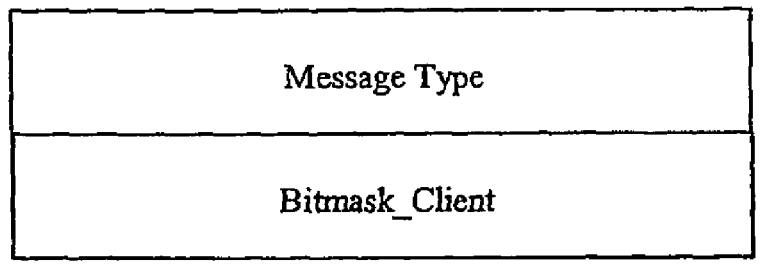

With reference to FIG. 4k, it is described the structure of the message Ack used for indicating the terminal receiving state.

The fields provided in this case are at least a set of the foil owing ones:
- Message_Type: identifies the sent message type (Ack);
- Bitmask_Client: is a bit mask having a size equal to the total number of radio blocks into which the operating software has been segmented; for each radio block it is set to "1" if the block has been successfully received and remains to "0" if the block has been received but corrupted or has not been received at all.

In summary, according to the example, the functional behaviour of OTA client and OTA server is as follows:
- the download procedure is started, for example, by the OTA-Server: the OTA-Client can request the activation of the download procedure;
- the mutual authentication between Client and Server occurs, for example, according to the "challenge-response" method;
- the operating software to be downloaded is, for example, segmented into blocks having a reduced size, e.g. in the range of 1 to 2 kBytes;
- the transferring of the operating software is managed, for example, by a simple window protocol wherein the window size matches with the number of blocks into which the operating software has been segmented;
- the downloaded operating software may be encrypted and, for example, a key is necessary for its decryption and installation;
- before starting the operating software, the client may check it with suitable tests suggested by the server.

Now, with reference to the FIGS. 5a-5j, the procedural interactions between the OTA-Client and the OTA-Server will be described by indicating for each protocol message received the relative behaviour according to the state in which the OTA-Client or the Client-Context are. The FIGS. 5a-5j show an example of all the possible procedural interactions.

For ease of understanding, it is reminded that timers are started/stopped when the OTA-Client or the Client-Context pass from one state to another state, as described previously.

Figure 5A:
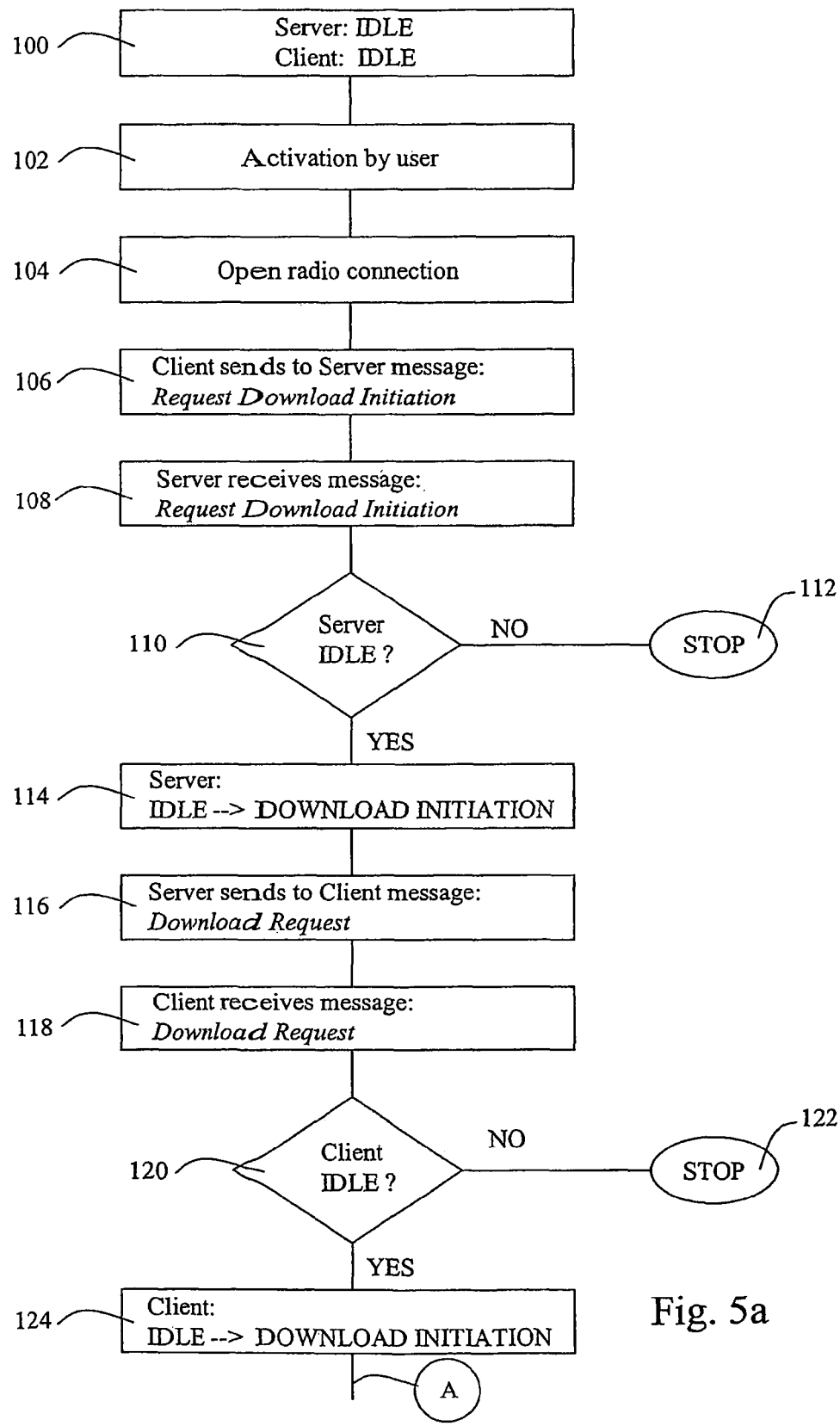
FIGS. 5a to 5j are flow-charts showing in detail the download procedure of an operating software to be installed in a radio mobile terminal.

With reference to FIG. 5a, when no operation is performed, the OTA-Client and the Client-Context relative to the OTA-Client considered and managed by the OTA-Server are in the state IDLE (step 100).

When the user, or the network, decides to perform the download of, a new operating software (step 102), a radio connection is open (step 104) and timer T100 is started. The radio connection will be illustrated in greater detail later on when describing FIG. 6.

At this stage, the OTA-Client can begin the software download procedure by sending the protocol message Request Download Initiation to the OTA-Server (step 106), the identifier identifying the OTA-Client being indicated in the message. As a general rule, if the OTA-Client_ID does not correspond to the identifier of the OTA-Client receiving the protocol message, the message is ignored.

Then the OTA-Server receives the message Request Download Initiation (step 108): if the state of the Client_Context is not IDLE (step 110), the message is ignored and the procedure stops (step 112); otherwise the Client-Context passes from the state IDLE to the state DOWNLOAD INITIATION (step 114), starts timer T101, and sends to the Client the protocol message Download Request indicating the various possible downloads (step 116). The OTA-Client receives the message Download Request (step 118): if the state of the OTA-Client is IDLE (step 120), the OTA-Client passes from the state IDLE to the state DOWNLOAD INITIATION (step 124); otherwise the message is ignored and the procedure stops (step 122).

Figure 5B:
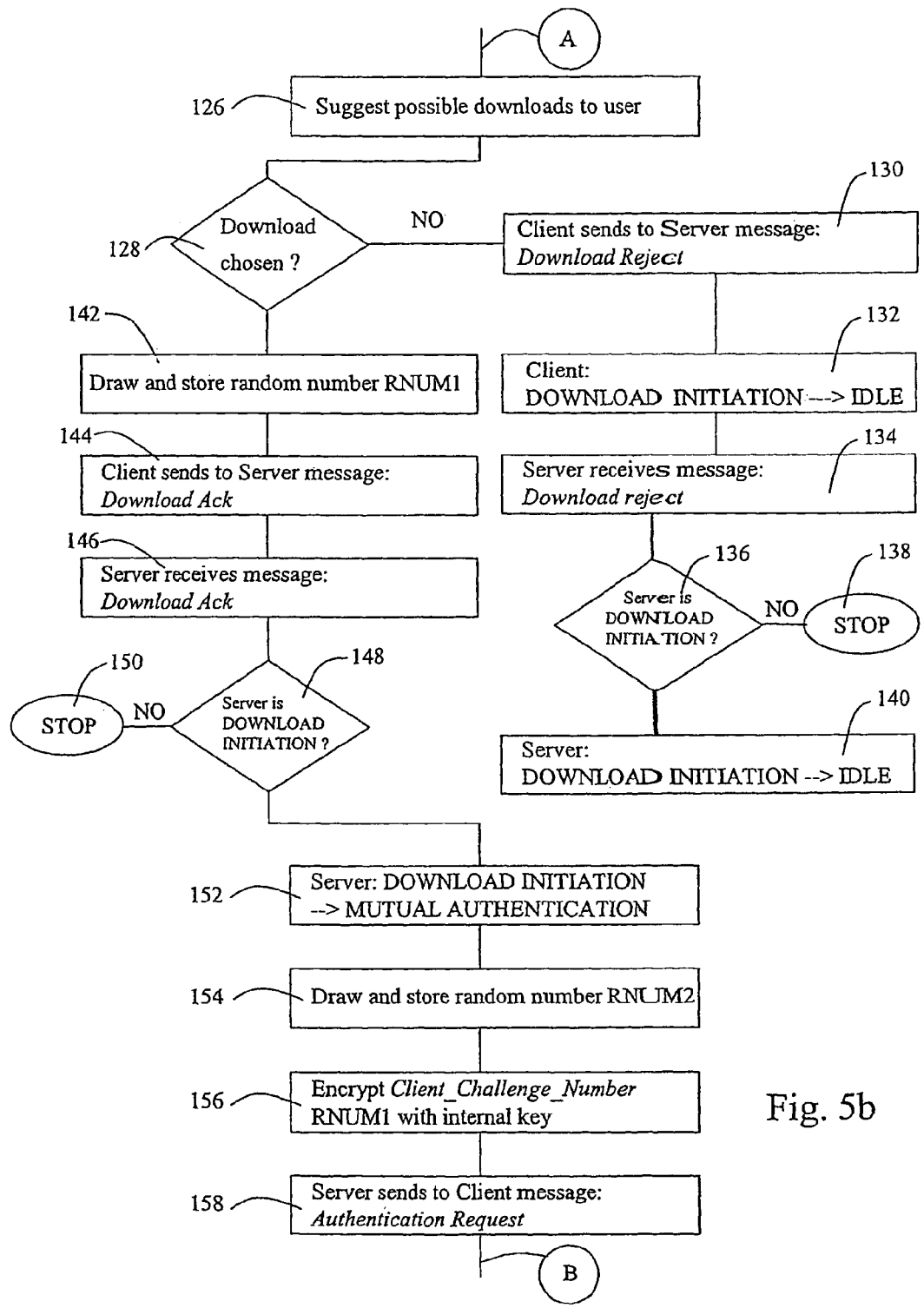
Figure 5C:
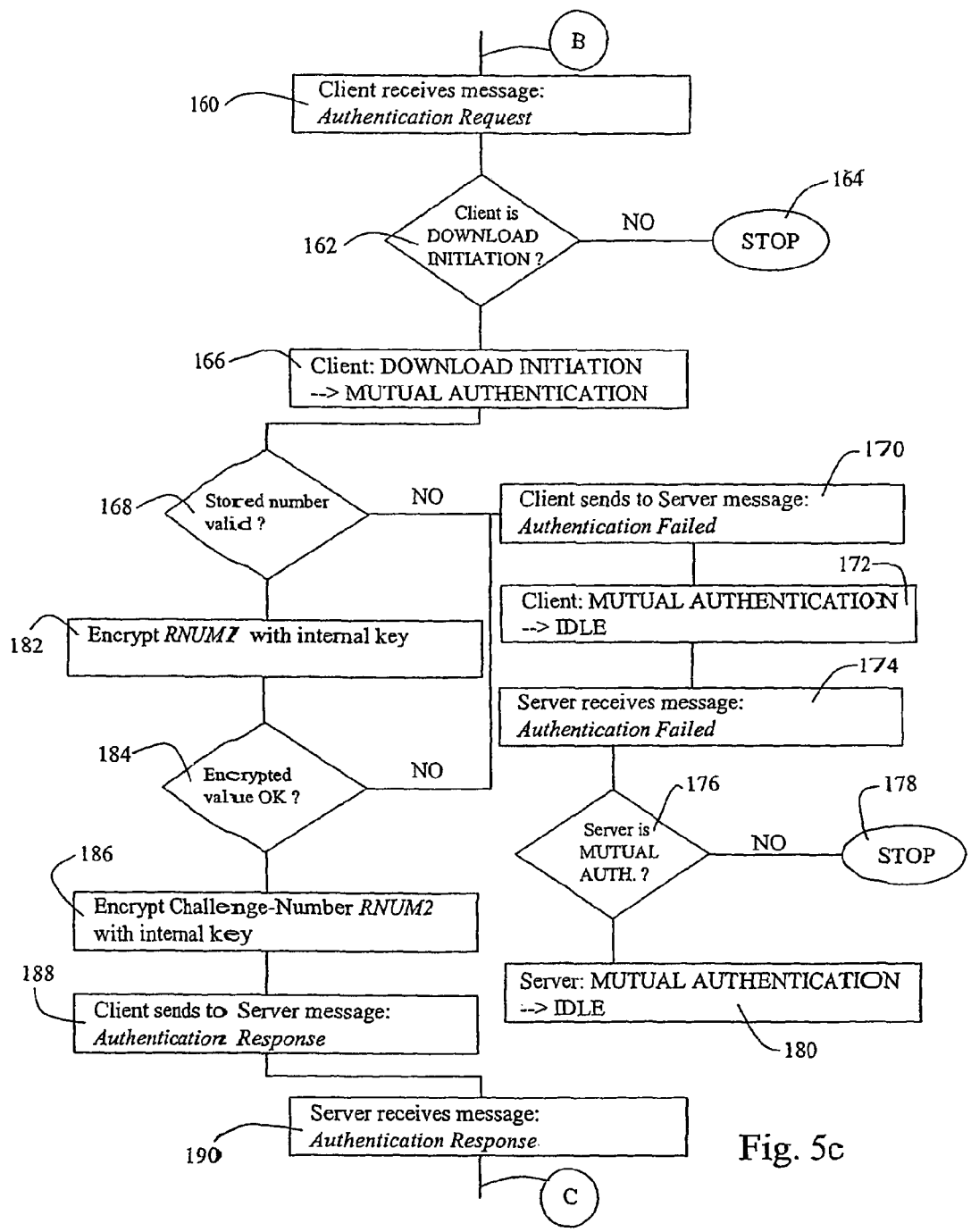

Making now reference to FIG. 5b, the user is then proposed the selection of the available downloads indicated in the message Download Request (step 126). If the user selects at least one download (step 128), the OTA-Client draws a random number RNUM1 and stores it (step 142), and sends to the OTA-Server the message Download Ack containing in the field OTA-Client_Challenge_Number the value of the drawn number RNUM1 (step 144).

If the user does not select any download (step 128), the OTA-Client sends to the Client-Context the message Download Reject (step 130) and returns to the state IDLE (step 132). Then the OTA-Server receives the message Download Reject (step 134). If the state of the Client-Context is not DOWNLOAD INITIATION (step 136), then the message is ignored and the procedure stops (step 138); otherwise the Client-Context returns to the state IDLE (step 140).

When the OTA-Server receives the message Download Ack (step 146): if the state of the Client-Context is not DOWNLOAD INITIATION (step 148), the message is ignored and the procedure stops (step 150); otherwise the Client_Context stops the timer T101 and passes from the state DOWNLOAD INITIATION to the state MUTUAL AUTHENTICATION (step 152), while starting timer T201.

Then a random number RNUM2 is drawn by the OTA-Server and stored (step 154). The value of the field OTA-Client_Challenge_Number is encrypted with the OTA-Server internal key by using the selected ciphering algorithm, like for instance AES (step 156).

The OTA-Server sends to the OTA-Client the protocol message Authentication Request with the value encrypted at the step 156 written in the field OTA-Server_Response_Number and with the value of the number drawn RNUM2 in the field OTA-Server_Challenge_Number (step 158). Then, with reference to FIG. 5c, the OTA-Client receives the message Authentication Request (step 160) and stops timer T100: if the OTA-Client is not in the state DOWNLOAD INITIATION (step 162), the message is ignored and the procedure stops (step 164); otherwise, the OTA-Client passes from the state DOWNLOAD INITIATION to the state MUTUAL AUTHENTICATION (step 166) while starting timer T200.

If the stored random number RNUM1 is not valid (step 168), the message Authentication Failed is sent by the OTA-Client to the Client-Context (step 170) and the OTA-Client passes from the state MUTUAL AUTHENTICATION to the state IDLE (step 172) and timer T200 is stopped. Then the Client-Context receives the message Authentication Failed (step 174) and stops the timer T201; if the Client-Context is in the state MUTUAL AUTHENTICATION (step 176), the Client-Context passes from the state MUTUAL AUTHENTICATION to the state IDLE (step 180); otherwise the procedure stops (step 178).

If the stored value RNUM1 is valid (step 168), the value of the stored random number RNUM1 is encrypted with the OTA-Client internal key by using the selected ciphering algorithm, like for instance AES (step 182). If the value encrypted at the step 182 does not match with the value contained in the field OTA-Server_Response_Number (step 184), the procedure goes back to step 170 and steps from 170 to 180, already described, are carried out. If the value encrypted at the step 182 matches with the value contained in the field OTA-Server_Response_Number (step 184), the value of the field OTA-Server_Challenge_Number is encrypted with the OTA-Client internal key by using the selected ciphering algorithm, like for instance AES (step 186). Then the message Authentication Response containing the value encrypted at the step 186 in the field OTA-Client_Response_Number is sent (step 188) by the OTA-Client to the Client-Context.

Figure 5D:
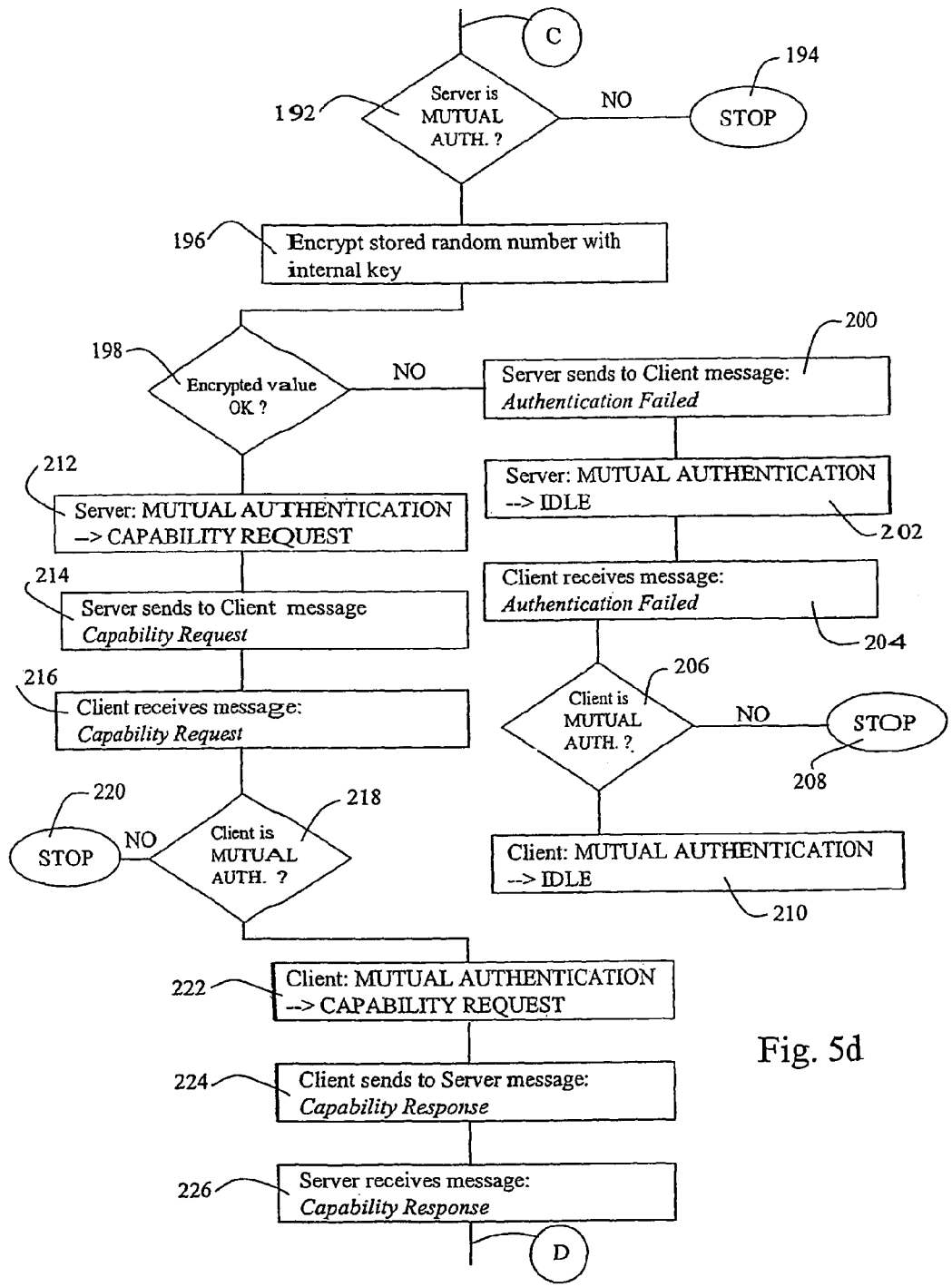

Then the OTA-Server receives the message Authentication Response (step 190): with reference to FIG. 5d, if the state of the Client_Context is not MUTUAL AUTHENTICATION (step 192), the message is ignored and the procedure stops (step 194); otherwise the value of the stored random number RNUM2 is encrypted with the OTA-Server internal key by using the selected ciphering algorithm, like for instance AES (step 196).

if the value encrypted at the step 196 does not match with the value of the field OTA-Client_Response_Number (step 198), the message Authentication Failed is sent by the Client-Context to the OTA-Client (step 200) and the client-Context passes from the state MUTUAL AUTHENTICATION to the state IDLE (step 202). Then the OTA-Client receives the message Authentication Failed (step 204): if the OTA-Client is in the state MUTUAL AUTHENTICATION (step 206), the OTA-Client passes from the state MUTUAL AUTHENTICATION to the state IDLE (step 210); otherwise the procedure stops (step 208).

If the value encrypted at the step 196 matches with the value of the field OTA-Client_Response_Number (step 198), the Client-Context stops timer T201, passes from the state MUTUAL AUTHENTICATION to the state CAPABILITY REQUEST (step 212) and activates timer T301. Then the protocol message Capability Request is sent by the Client-Context to the OTA-Client (step 214) and is received by the OTA-Client (step 216) which stops timer T200: if the state of the OTA-Client is not MUTUAL AUTHENTICATION (step 218), the message is ignored and the procedure stops (step 220); otherwise the OTA-Client passes from the state MUTUAL AUTHENTICATION to the state CAPABILITY REQUEST (step 222) while starting timer T300. Then the OTA-Client sends to the Client-Context the message Capability Response (step 224) and the Client-Context receives it (step 226).

Figure 5E:
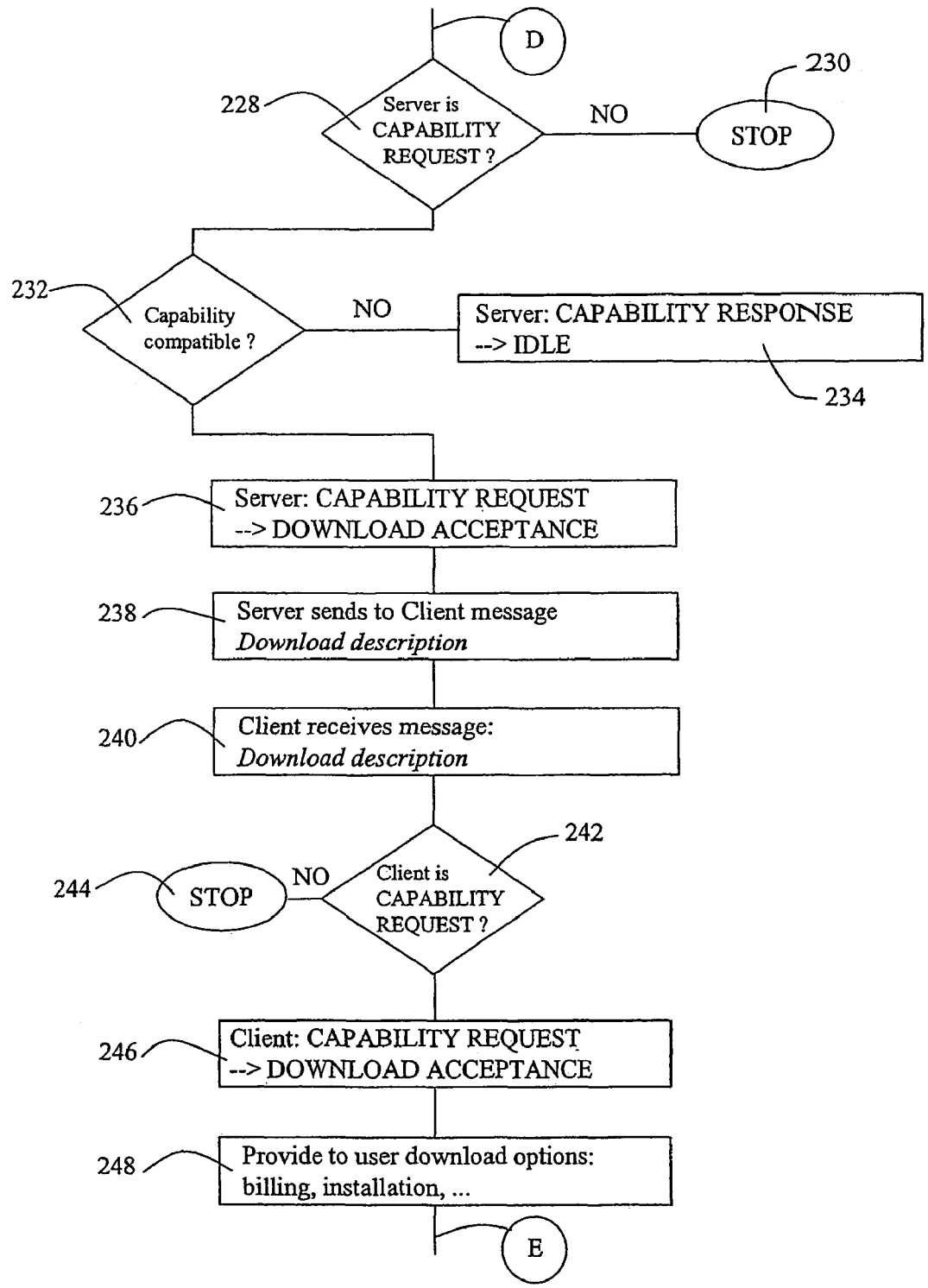

With reference to FIG. 5e, if the state of the Client-Context is not CAPABILITY REQUEST (step 228), the message is ignored and the procedure stops (step 230); otherwise, if the capability contained in the message is not compatible with the software to be downloaded (step 232), the Client-Context passes from the state CAPABILITY RESPONSE to the state IDLE (step 234) and timer T301 is stopped. If the capability is compatible with the software to be downloaded (step 232), timer T301 is stopped, the Client-Context passes from the state CAPABILITY REQUEST to the state DOWNLOAD ACCEPTANCE (step 236) while starting timer T302 and sends to the OTA-Client the message Download Description (step 238).

Figure 5F:
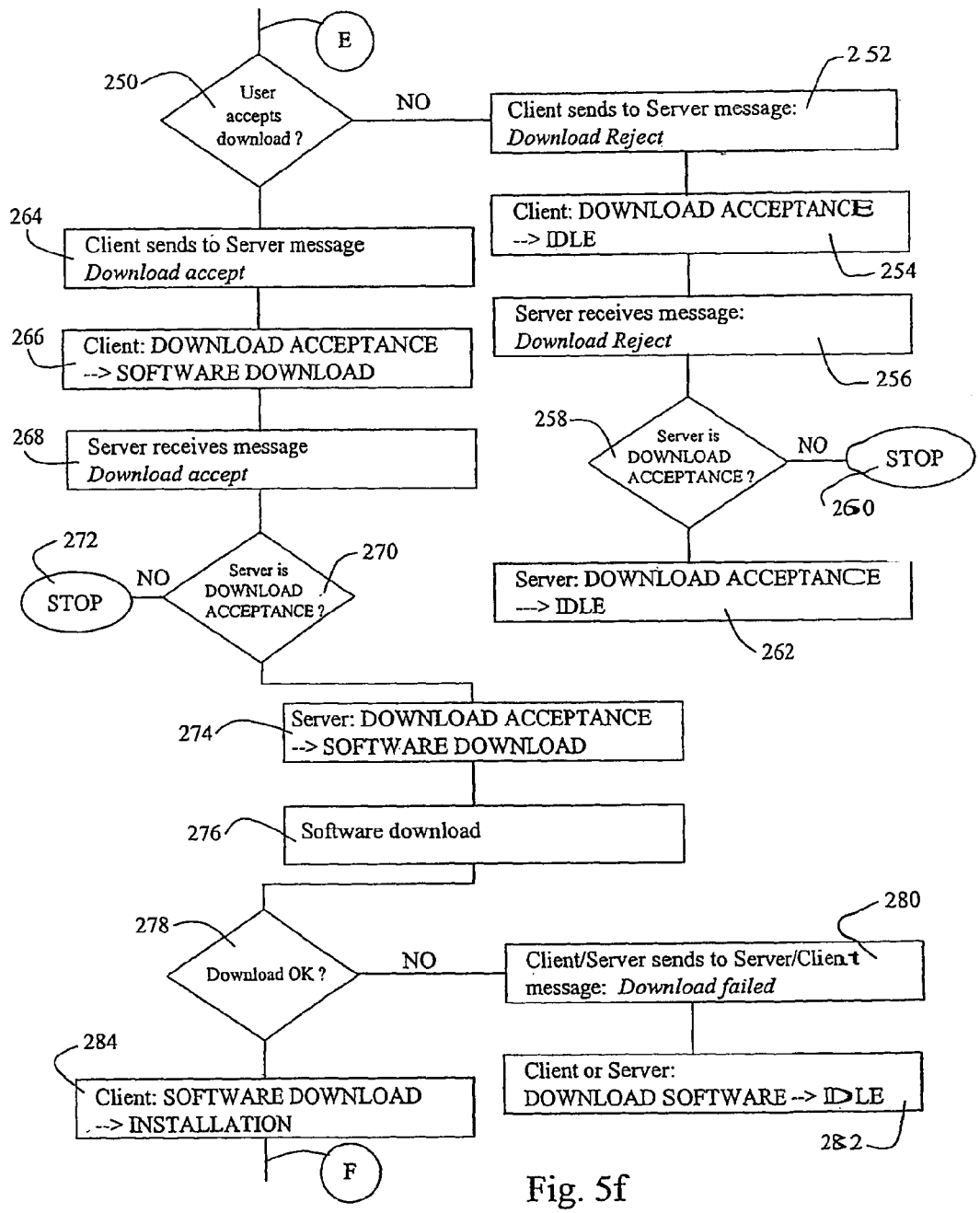

Then the OTA-Client receives the message Download Description (step 240) and stops timer T300: if the OTA-Client is not in the state CAPABILITY REQUEST (step 242), the message is ignored and the procedure stops (step 244); otherwise the OTA-Client passes from the state CAPABILITY REQUEST to the state DOWNLOAD ACCEPTANCE (step 246). The download options like billing, installation and so on are proposed to the user (step 248). With reference to FIG. 5f, if the user rejects the download (step 250), the OTA-Client sends the message Download Reject to the Client-Context (step 252) and passes from the state DOWNLOAD ACCEPTANCE to the state IDLE (step 254). Moreover, the Client-Context receives the message Download Reject (step 256); if the state of the Client-Context is not DOWNLOAD ACCEPTANCE (step 258), the message is ignored and the procedure stops (step 260); otherwise the Client-Context passes from the state DOWNLOAD ACCEPTANCE to the state IDLE (step 262).

If the user accepts the download (step 250), then the OTA-Client sends to the Client-Context the message Download Accept (step 264) and the OTA-Client passes from the state DOWNLOAD ACCEPTANCE to the state SOFTWARE DOWNLOAD (step 266).

Then the Client-Context receives the message Download Accept (step 268) and stops timer T302: if the state of the Client-Context is not DOWNLOAD ACCEPTANCE (step 270), the message is ignored and the procedure stops (step 272); otherwise the Client-Context passes from the state DOWNLOAD ACCEPTANCE to the state SOFTWARE DOWNLOAD (step 274), while starting timer T400, and the software download begins (step 276).

If the software download is not successful (step 278), then the OTA-Client/Client-Context sends to the Client-Context/OTA-Client the message Download Failed (step 280) and the OTA-Client/Client-Context passes from the state DOWNLOAD SOFTWARE to the state IDLE (step 282). The software download (step 276) will be explained in more detail later.

Figure 5G:
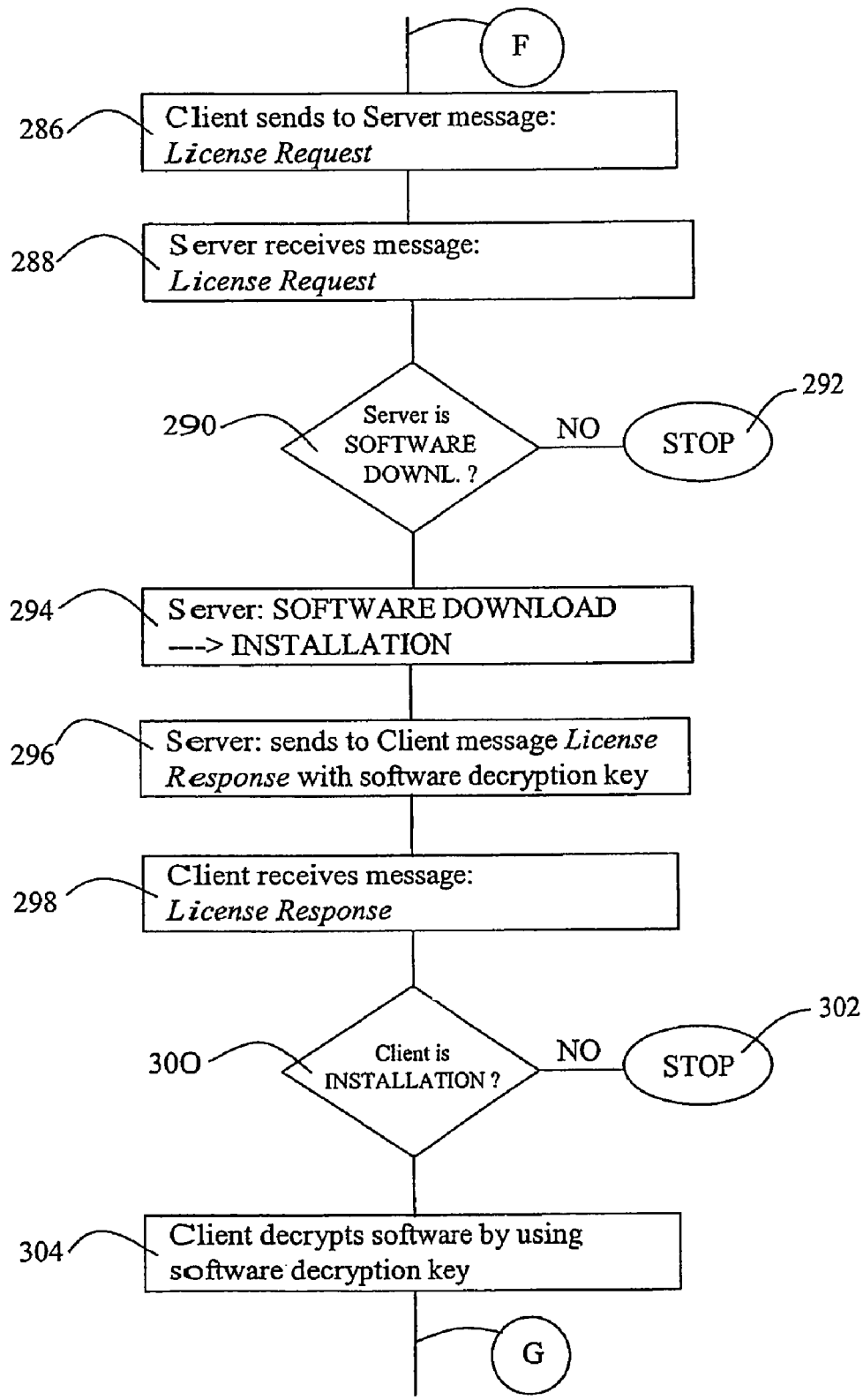

If the download is successful (step 278), then the OTA-Client passes from the state SOFTWARE DOWNLOAD to the state INSTALLATION (step 284). With reference to FIG. 5g, the OTA-Client sends to the Client-Context the message License Request (step 286) and the OTA-Server receives it (step 288). If the state of the Client-Context is not SOFTWARE DOWN LOAD (step 290), then the message is ignored and the procedure stops (step 292); otherwise the Client-Context procedure passes from the state SOFTWARE DOWNLOAD to the state INSTALLATION (step 294), while starting timer T500, and sends to the OTA-Client the message License Response containing the key for decrypting the operating software (step 296).

Figure 5H:
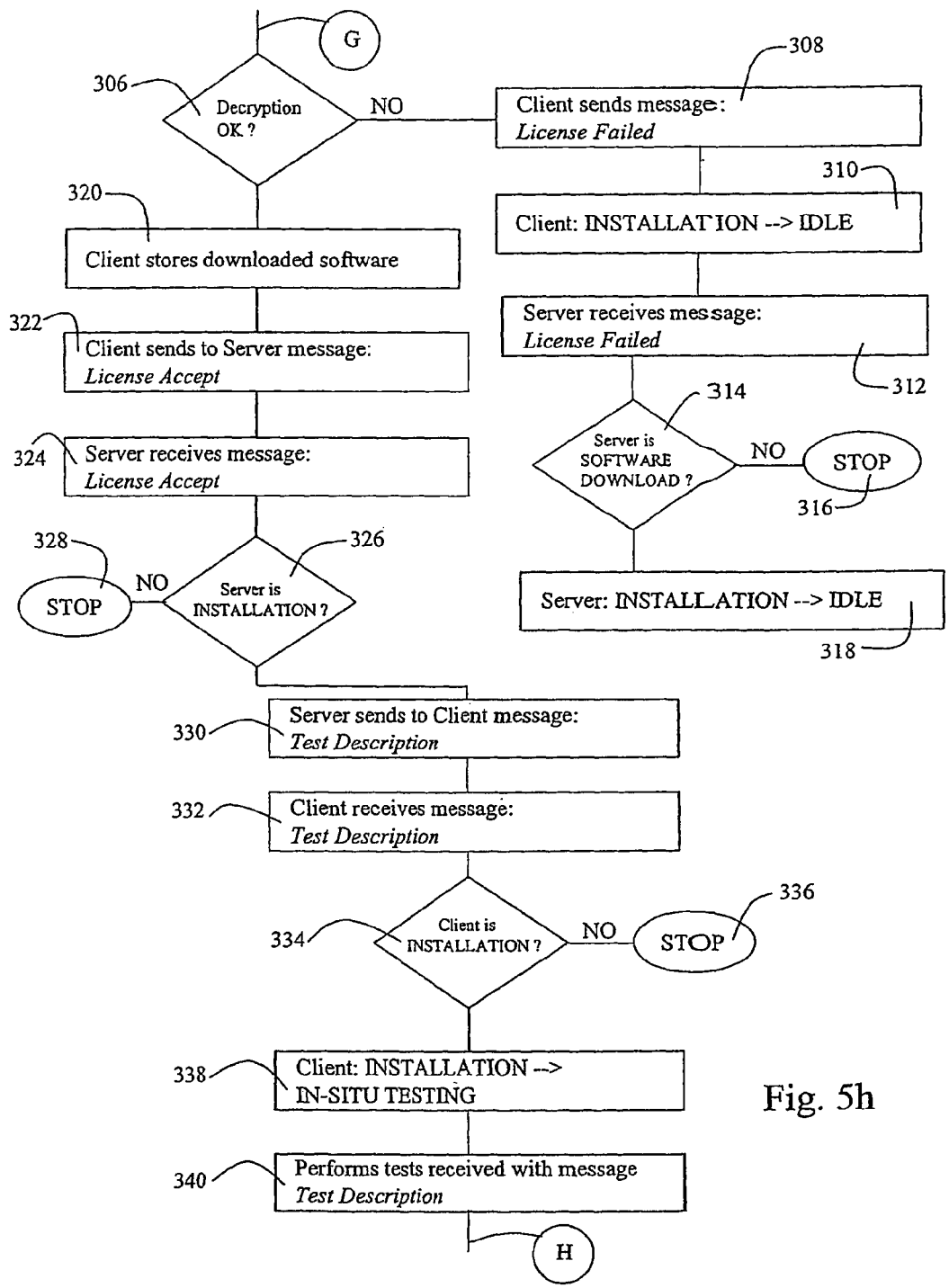

The OTA-Client receives the message License Response (step 298): if the OTA-Client is not in the state INSTALLATION (step 300), the message is ignored and the procedure stops (step 302); otherwise the OTA-Client decrypts the downloaded software by using the key indicated in the field Decrypt_key (step 304). With reference to FIG. 5h, if the decryption is unsuccessful (step 306), the OTA-Client sends the message License Failed to the Client-Context (step 308), stops timer T500, and passes from the state INSTALLATION to the state IDLE (step 310). Moreover, the Client-Context receives the message License Failed (step 312): if the Client-Context is not in the state SOFTWARE DOWNLOAD (step 314), the procedure stops (step 316); otherwise the Client-Context passes from the state INSTALLATION to the state IDLE (step 318).

If the decryption is unsuccessful (step 306), the downloaded operating software is stored in the client or terminal (step 320).

The OTA-Client sends the message License Accept to the CI lent-Context (step 322) and the OTA-Server receives it (step 324): if the state of the Client-Context is not INSTALLATION (step 326), the message is ignored and the procedure stops (step 328); otherwise the Client-Context sends the protocol message Test Description to the OTA-Client (step 330) and the OTA-Client receives it (step 332). If the OTA-Client is not in the state INSTALLATION (step 334), the message is ignored and the procedure stops (step 336); otherwise the OTA-Client stops the timer T500 and passes from the state INSTALLATION to the state IN-SITU TESTING (step 338) where the received tests are performed on the operating software previously stored (step 340).

Figure 5I:
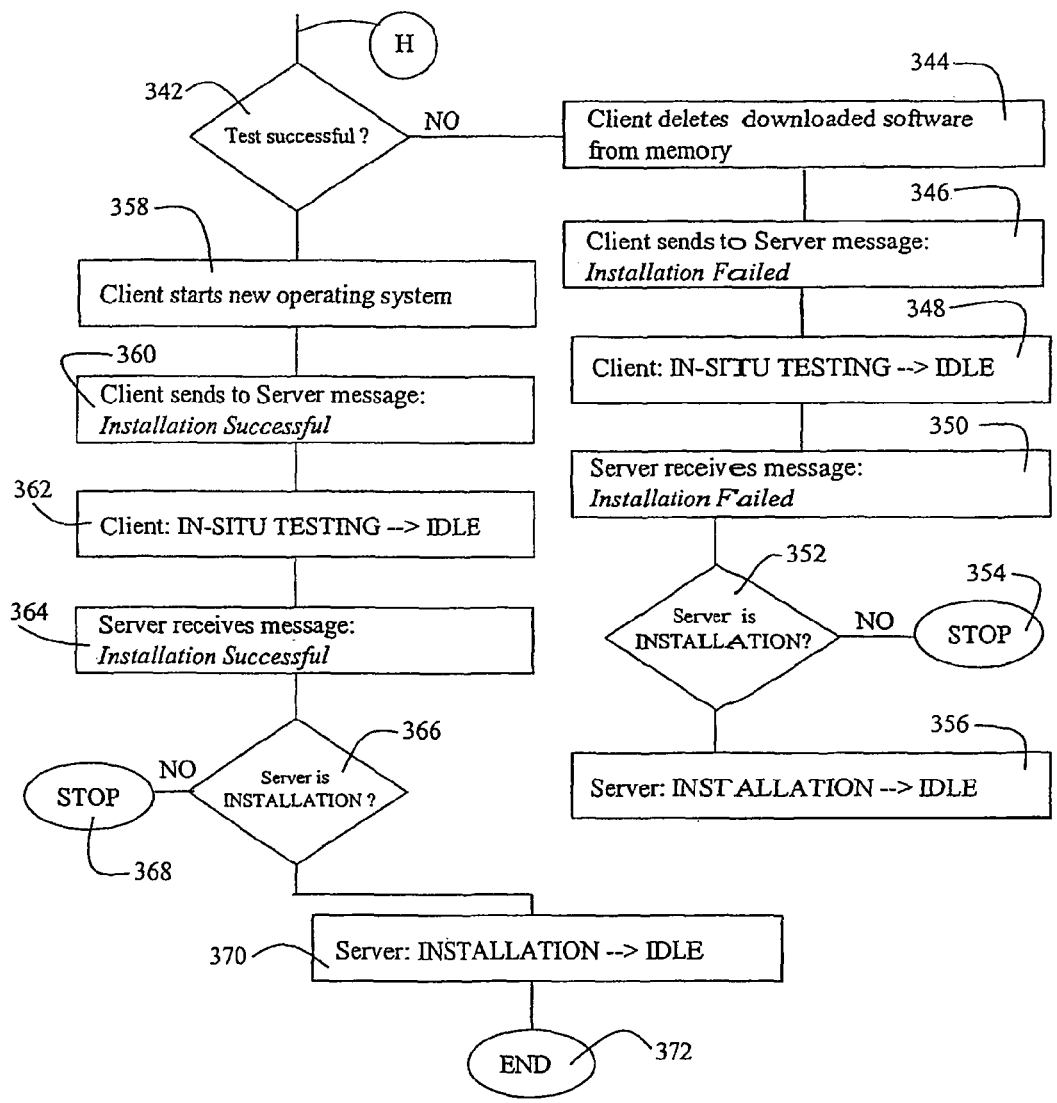

With reference to FIG. 5i, if at least one test is unsuccessful (step 342), then the OTA-Client deletes the operating software from the memory (step 344), sends the message Installation Failed (step 346) to the Client-Context, and passes from the state IN-SITU TESTING to the state IDLE (step 348). Moreover, the Client-Context receives the message Installation Failed (step 350): if the state of the Client-Context is not INSTALLATION (step 352), the message is ignored and the procedure stops (step 354): otherwise the Client-Context passes from the state INSTALLATION to the state IDLE (step 356). If all the tests performed on the operating software are successful (step 342), then the new operating software is installed and started in the OTA-Client (step 358). The OTA-Client sends the message Installation Successful to the Client-Context (step 360) and passes from the state IN-SITU TESTING to the state IDLE (step 362).

The OTA-Server receives the message Installation Successful (step 364): if the state of the Client-Context is not INSTALLATION (step 366), the message is ignored and the procedure stops (step 368); otherwise the Client-Context passes from the state INSTALLATION to the state IDLE (step 370), thereby completing the whole procedure (step 372).

Figure 5J:
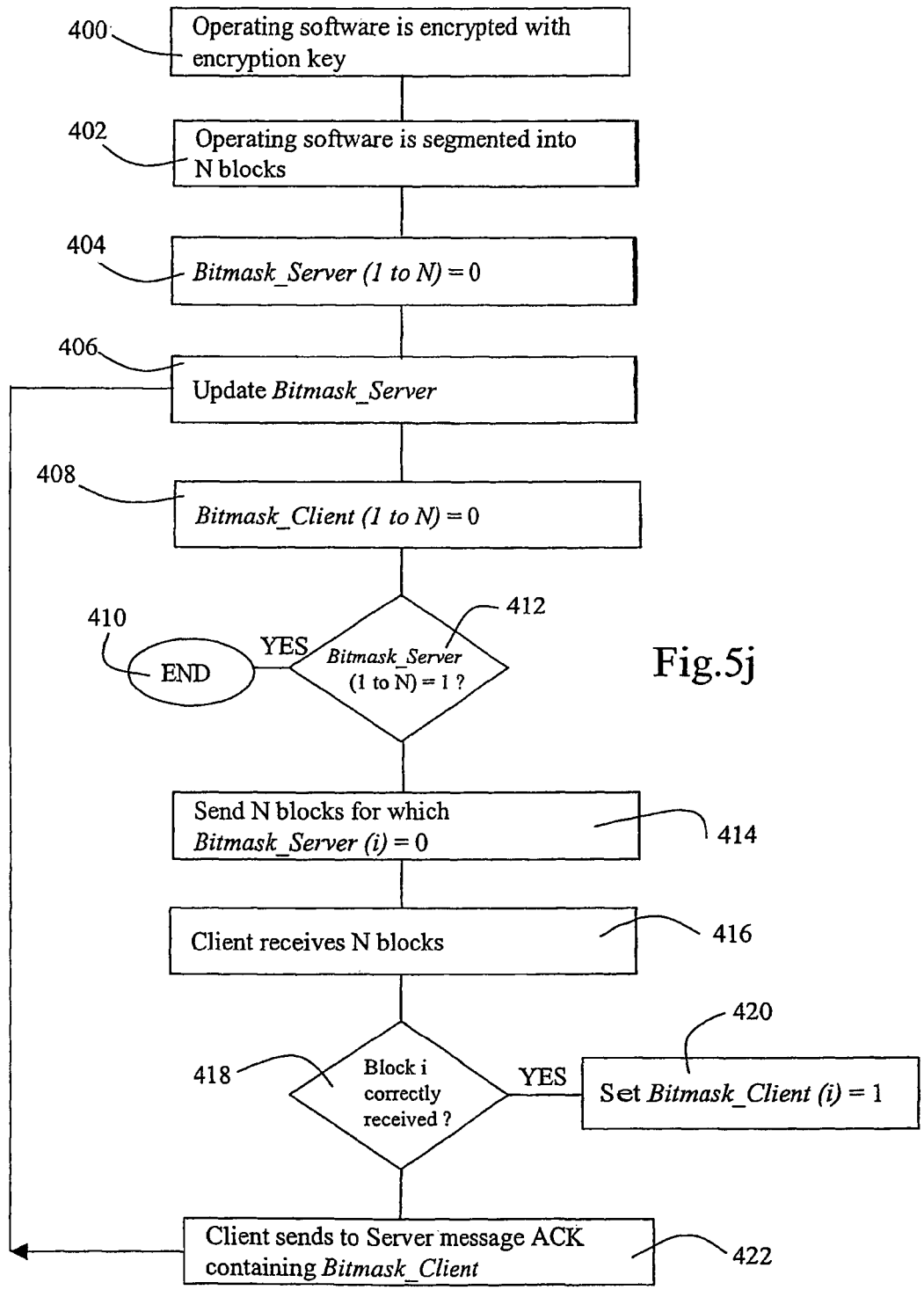

With reference to FIG. 5j, it will be now described in greater detail, the download procedure of step 276. The operating software is encrypted with an encryption key and by means of a ciphering algorithm, like for instance AES (step 400). Then the encrypted operating software is segmented into blocks having a reduced size of approximately 1 to 2 kBytes (step 402).

There are allocated one bit mask Bitmask_Server and one bit mask Bitmask_Client equal to the number of radio blocks into which the software has been segmented and for each mask bit the value "0" is set; each mask bit corresponds to the radio block the number of which is equal to the bit position, that is the first bit corresponds to the first radio block; the second bit to the second radio block and so on (step 404 and step 408).

At step 406 the Bitmask_Server is updated according to the content of the Bitmask_Client. More in particular, if a bit of the Bitmask_Client has been set to 1, then the corresponding bit of the Bitmask_Server is set to 1 (step 406) as well. When running the download procedure for the first time, this step has no meaning since all bits of the Bitmask_Client and of the Bitmask_Server are set to 0.

At step 412, it is checked whether all bits of the bit mask Bitmask_Server are equal to 1. In positive case, the download of the operating software has ended and all blocks have been successfully received (step 410); otherwise the download has not ended yet and the OTA-Server sends to the OTA-Client all the blocks i for which Bitmask_Server (i)=0 (step 414). Obviously, when running the procedure for the first time, all N blocks into which the operating software has been segmented are sent to the Client.

Then the OTA-Client receives N blocks (step 416); at each received block timer T400 is restarted. Each time a block i is correctly received (step 418), then the corresponding bit of the bit mask Bitmask_Client (i) is set to 1. When all N blocks have been sent, the OTA-Client sends to the OTA-Server a message Ack containing the bit mask Bitmask_Client wherein the bit i corresponding to a block correctly received is set to 1. When receiving a message Ack, timer T401 is restarted.

Then the procedure comes back to step 406 where the bit mask Bitmask_Server is updated.

When the desired operating software has been downloaded and stored into the terminal, instead of installing and running it immediately, it is possible to install and run it successively upon a request corning from the network or from the user. If the radio terminal UE/MS has enough memory and processing capability, the downloaded operating software can be stored and installed concurrently to the already existing and currently working system. This option is useful for allowing a multi-mode working of the terminal UE/MS, in other words this option grants that the terminal is able to switch from one operating mode to another one without the necessity to download the operating software.

Figure 6:
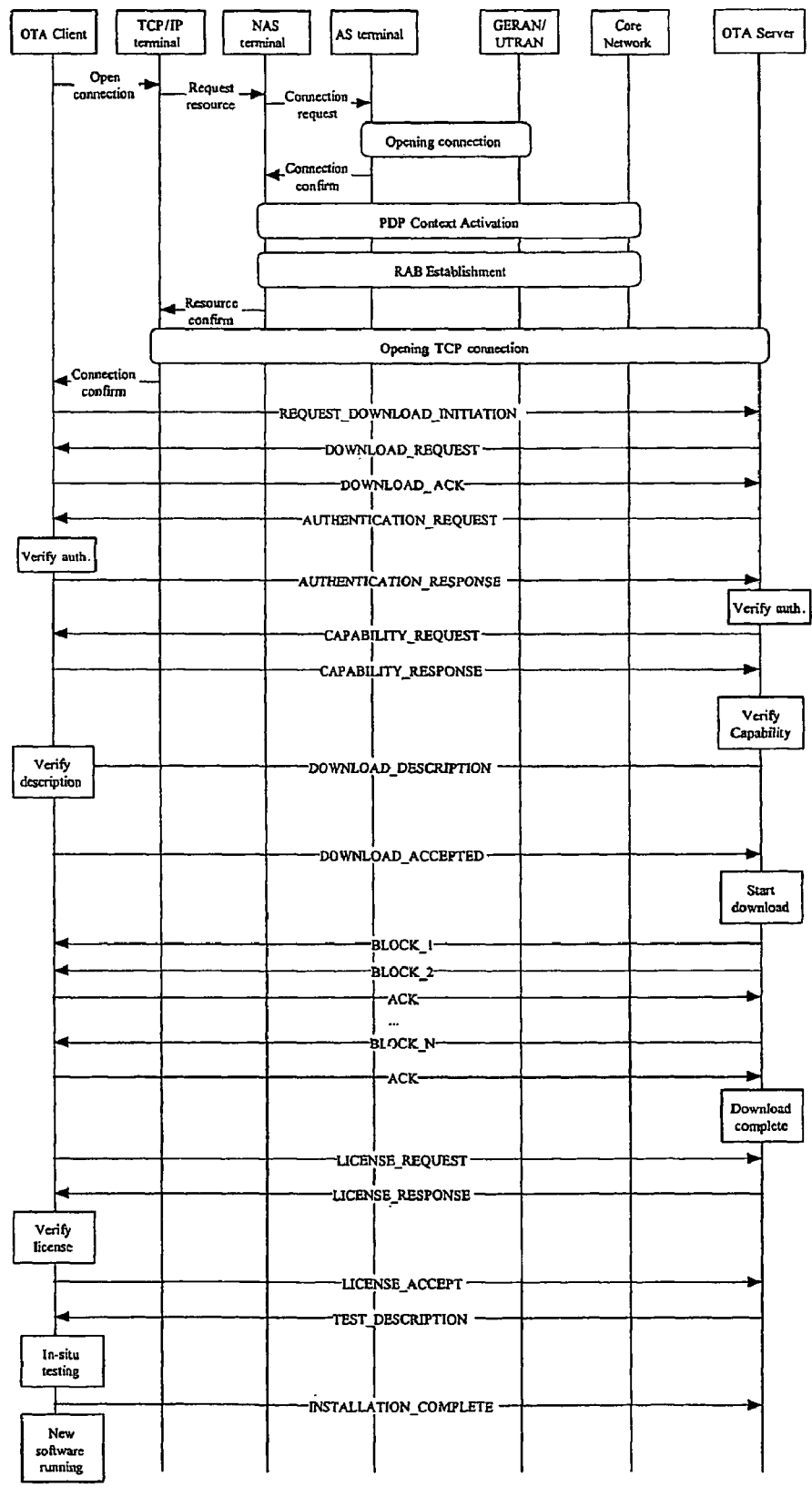
FIG. 6 illustrates a sequence diagram of the download procedure showing in particular the opening of the radio connection between a mobile radio terminal and the server.

With reference to FIG. 6, it will be now described in more detail the opening of the radio connection performed at step 104.

In the terminal the following modules are considered: the application OTA-Client, the protocol TCP/IP, the module Non Access Stratum NAS and the module Access Stratum AS. The radio access devices GSM/GPRS (GERAN) and UMTS (UTRAN) are considered in their entirety. The same reasoning applies also for the Core Network nodes. The OTA-Server node is connected to the Core Network. The detailed working in case of a download request coming from the terminal UE/MS is described in the following:
  the OTA-Client requests the protocol TCP/IP to open a connection on a port X;
  the TCP/IP, before opening the connection, needs a radio channel and therefore sends a corresponding request to the protocols NAS of the terminal;
  the protocols NAS of the terminal request to the module AS of the terminal the opening of a radio connection;
  the protocols AS of the terminal open the radio connection with the radio access network GSM/GPRS (GERAN) or UMTS (UTRAN), and confirm the opening at the level NAS;
  the module NAS activates the PDP Context;
  in the case of the UMTS system, the Core Network activates the Radio Access Bearer RAB for the transport;
  the module NAS confirms the opening of the transport channel to the TCP/IP;
  the protocol TCP/IP opens the connection and confirms the opening to the OTA-Client.

In general, the management of the software download by means of an application layer may be also carried out with an alternative method where the radio system employed is of the multi-cast or broad-cast type.

In particular, this variant may be implemented, for example, in the following way:
  the terminal UE/MS is provided with an application able to manage the download of the OTA operating software by exploiting Broadcast/Multicast capabilities, for example, the service MBMS (Multimedia Broadcast/Multicast Service) as specified by the release 6 of the Standard 3GPP; in this case, by using the Broadcast/Multicast capabilities of the network, it is possible to download the operating software to a plurality of terminals;
  the application layer carries out the authentication according to the Standard 3GPP;
  from the point of view of the access network and of the Core Network, the software download service is transparent and is considered like whatever else MBMS service, for instance with the identification "Software Download";
  it is possible to exploit all the features of the considered network, like for instance Quality of Service (QoS) in order to assure a certain download reliability;
  the architecture is independent from the considered access network (GE RAN/UTRAN);
  the users desiring to perform the download may register themselves to the server;
  the download occurs simultaneously towards all registered users.

A further variant of the invention consists in downloading the software OTA by using a universal channel. Also in this case it is possible to apply the invention for performing the download of the operating software without modifying intrusively the network architecture managing said universal channel. Alternatively, the download occurs through a radio channel of the communication network.

The invention has been described in detail for a second and for a third generation system, however it can be implemented also in other type of networks, e.g. a Wireless Local Area Network (WLAN), DVB, etc.

In fact, the solution proposed according to present invention provides for an OTA server external to the system in use and, therefore, it is such that to not modify the system in use.

Moreover, according to a preferred embodiment of present invention, it is provided to use the TCP/IP protocol, which, as a skilled person knows, is extendedly used in a very large number of systems or networks.

According to further embodiments of present invention, it is also possible to use a transport protocol different from TCP/IP, as for example UDP (User Datagram Protocol), without impacting on the architecture of the present invention.

The invention claimed is:

1. Network architecture comprising:
  a communication network being operative according to a predetermined cellular communication system and communicating with at least one radio terminal belonging to said communication network; and
  at least one node connected to said communication network comprising:
    a set of operating software modules configured for implementing at least one set of elements of a protocol stack for configuring said radio terminal,
    said radio terminal and said node being provided with respective over-the-air software modules configured for managing an over-the-air connection independent from the predetermined cellular communication system between said radio terminal and said node through said communication network, said node downloading transparently to and independent from said communication network at least one module of said set of operating software modules for configuring at least in part said radio terminal, wherein said downloading includes segmenting the at least one module into blocks, transmitting the blocks from the node to the radio terminal, and limiting the time allowed for performing the over-the-air connection, wherein said set of operating software modules is suitable for reconfiguring at least in part said radio terminal to be operative with a further communication system having different protocols than the predetermined cellular communication system.

2. The architecture according to claim 1, wherein said communication network comprises a radio access network and a core network and wherein said node is connected to said core network.

3. The architecture according to claim 2, wherein the predetermined cellular communication system is a second generation network communication system.

4. The architecture according to claim 2, wherein the predetermined cellular communication system is a third generation network communication system.

5. The architecture according to claim 2, wherein said core network comprises a packet domain.

6. The architecture according to claim 5, wherein said packet domain comprises at least one serving general packet radio service support type node and at least one gateway general packet radio service support type node, and wherein said node is directly connected to said at least one gateway general packet radio service support type node.

7. The architecture according to claim 1, wherein said over-the-air connection is established through a universal channel of said communication network.

8. The architecture according to claim 1, wherein said over-the-air connection is established through a radio channel of said communication network.

9. The architecture according to claim 1, wherein said radio terminal is provided with a memory able to store at least two operating software modules, and wherein said radio terminal comprises multi mode working modules for switching between said at least two operating software modules.

10. The architecture according to claim 1, wherein said radio terminal is configured as a client and said node is configured as a server.

11. The architecture according to claim 1, wherein said information comprises at least said operating software modules.

12. The architecture according to claim 1, wherein
said communication network is provided with broadcast/multicast capabilities, and
said at least one radio terminal is provided with an application able to manage said broadcast/multicast capabilities,
wherein said communication network is configured for allowing a multi-cast downloading of said at least one module of said set to said at least one radio terminal.

13. The architecture according to claim 1, wherein for establishing said over-the-air connection between said at least one radio terminal and said node, transport control protocol/internet protocol is employed.

14. A method for configuring at least one reconfigurable radio terminal user equipment/mobile station belonging to a communication network operative according to a predetermined cellular communication system and able to exchange information within said communication network by using said predetermined cellular communication system, comprising:

connecting to said communication network at least one node comprising a set of operating software modules for configuring said radio terminal user equipment/mobile station with at least one set of elements of a protocol stack;

establishing an over-the-air connection independent from the predetermined cellular communication system between said radio terminal user equipment/mobile station and said node through said communication network;

downloading transparently to and independent from said communication network at least one module of said set of operating software modules from said node to said reconfigurable radio terminal user equipment/mobile station for configuring at least in part said radio terminal user equipment/mobile station, wherein said set of operating software modules is suitable for reconfiguring at least in part said radio terminal user equipment/mobile station to be operative with a further communication system having different protocols than the predetermined cellular communication system, said downloading comprising segmenting said at least one module into blocks;

transmitting said blocks from said node to said at least one radio terminal user equipment/mobile station; and limiting the time allowed for performing an over-the-air connection.

15. The method according to claim 14, wherein said establishing an over-the-air connection comprises exchanging protocol messages by performing at least one set of the following steps representative of protocol steps:

performing a request for downloading said at least one module;

mutually authenticating said at least one radio terminal user equipment/mobile station and said node;

checking the capability of said radio terminal user equipment/mobile station of accepting said at least one module downloadable from said node; and providing information concerning the download options.

16. The method according to claim 15, wherein said exchanging protocol messages further comprises a step of:
monitoring the structure of said blocks downloaded to said radio terminal user equipment/mobile station.

17. The method according to claim 15, wherein said exchanging protocol messages further comprises a step of:
allocating for each protocol step at least a pair of timers, a first timer for monitoring the protocol steps performed by said radio terminal user equipment/mobile station and a second timer for monitoring the protocol steps performed by said node over-the-air server, each of said timers being started when one protocol step is started and being stopped when said one protocol step has been performed.

18. A method according to claim 15, wherein said mutual authentication step is based on a "challenge-response" method.

19. The method according to claim 15, wherein said step of segmenting said at least one operating software module into blocks comprises the step of segmenting into blocks having a size of 1 to 2 kBytes, and wherein the step of transmitting said blocks comprises managing a window protocol wherein a window size matches the size of the blocks into which the at least one operating software module has been segmented.

20. The method according to claim 15, wherein a license is required from the radio terminal.

21. The method according to claim 14, wherein said at least one operating software module, before being downloaded to said radio terminal, is encrypted with a key.

22. The method according to claim 14, wherein for establishing said over-the-air connection between said at least one radio terminal user equipment/mobile station and said node, transport control protocol/internet protocol is employed.

23. The method according to claim 14, comprising the further step of storing at least two operating software modules into said reconfigurable radio terminal user equipment/mobile station.

24. The method according to claim 14, wherein said step of downloading said at least one module of said set comprises the step of
    downloading a set of operating software modules suitable for reconfiguring at least in part said radio terminal user equipment/mobile station to be operative with a further communication system having different protocols than the predetermined cellular communication system.

25. The method according to claim 14, wherein said step of downloading said at least one module of said set comprises the step of
    installing and running said at least one module of said set upon a request coming from said radio terminal user equipment/mobile station or said communication network.

26. A radio terminal user equipment/mobile station configurable by carrying out the method as claimed in claim 14.

27. A network node for configuring a configurable radio terminal user equipment/mobile station by carrying out the method as claimed in claim 14.

28. A non-transitory computer-readable storage medium containing instructions that, when executed by a computer, perform a method comprising the steps of claim 14.

* * * * *